United States Patent
Stefek et al.

(10) Patent No.: US 7,024,388 B2
(45) Date of Patent: Apr. 4, 2006

(54) METHOD AND APPARATUS FOR AN INTEGRATIVE MODEL OF MULTIPLE ASSET CLASSES

(75) Inventors: Daniel Stefek, Oakland, CA (US); Lisa Robin Goldberg, Kensington, CA (US); Scott Steven Scheffler, Berkeley, CA (US); Ken Chorlam Hui, Alameda, CA (US); Nicolas Goodrich Torre, Greenwich, CT (US)

(73) Assignee: Barra Inc., Berkeley, CA (US)

( * ) Notice: Subject to any disclaimer, the term of this patent is extended or adjusted under 35 U.S.C. 154(b) by 597 days.

(21) Appl. No.: 09/895,605

(22) Filed: Jun. 29, 2001

(65) Prior Publication Data

US 2003/0110016 A1 Jun. 12, 2003

(51) Int. Cl.
*G06F 17/60* (2006.01)

(52) U.S. Cl. .......................... 705/38; 706/62; 706/925; 706/932

(58) Field of Classification Search .................. 705/35, 705/36, 37, 38, 7, 4; 706/13, 62, 925, 45, 706/46, 48, 932
See application file for complete search history.

(56) References Cited

U.S. PATENT DOCUMENTS

| | | | | |
|---|---|---|---|---|
| 5,832,465 A | * | 11/1998 | Tom | 706/51 |
| 6,012,044 A | * | 1/2000 | Maggioncalda et al. | 705/36 |
| 6,021,397 A | * | 2/2000 | Jones et al. | 705/36 |
| 6,282,520 B1 | * | 8/2001 | Schirripa | 705/36 |
| 6,405,179 B1 | * | 6/2002 | Rebane | 705/36 |
| 6,453,303 B1 | * | 9/2002 | Li | 705/36 |
| 2002/0004775 A1 | * | 1/2002 | Kossovsky et al. | 705/37 |
| 2002/0091605 A1 | * | 7/2002 | Labe et al. | 705/36 |
| 2002/0165841 A1 | * | 11/2002 | Quaile | 706/45 |
| 2003/0009408 A1 | * | 1/2003 | Korin | 705/36 |
| 2003/0009409 A1 | * | 1/2003 | Horner et al. | 705/36 |
| 2003/0014356 A1 | * | 1/2003 | Browne et al. | 705/38 |
| 2003/0033240 A1 | * | 2/2003 | Balson et al. | 705/37 |
| 2003/0046212 A1 | * | 3/2003 | Hunter et al. | 705/36 |
| 2003/0055765 A1 | * | 3/2003 | Bernhardt | 705/36 |
| 2003/0078867 A1 | * | 4/2003 | Scott et al. | 705/36 |
| 2003/0126058 A1 | * | 7/2003 | Hunter | 705/36 |
| 2003/0139993 A1 | * | 7/2003 | Feuerverger | 705/36 |
| 2003/0208429 A1 | * | 11/2003 | Bennett | 705/36 |
| 2004/0103056 A1 | * | 5/2004 | Ikeda et al. | 705/38 |

OTHER PUBLICATIONS

Mulvey, J.M., "Solving Robust Optimization Models in Finance", IEEE/IAFE Conference on Computational Intelligence for Financial Engineering, Mar. 1996.*

Vacca, L., "Managing Options Risk with Genetic Algorithms", Proceedings of the IEEE/IAFE 1997 Computational Intelligence fo Financial Engineering, Mar. 1997.*

Cai et al., "Portfolio Optimization Under Ioo Risk Measure", Proceedings of the 35th Conference on Decision and Control, Dec. 1996.*

Gordon, J., "Security Modeling", IEE Colloquium on Risk Analysis Methods and Tools, Jun. 1992.*

Ogryczak et al., "From Stochastic Dominance to Mean–Risk Models: Semideviations as Risk Measures", International Institute for Applied Systems Analysis, Interim Report IR–97–027, Jun. 1997.*

(Continued)

*Primary Examiner*—Anthony Knight
*Assistant Examiner*—Michael B. Holmes
(74) *Attorney, Agent, or Firm*—Michael A. Glenn; Glenn Patent Group

(57) ABSTRACT

The invention provides a method and apparatus for combining two or more risk models to create a risk model with wider scope than its constituent parts. The method insures that the newly formed risk model is consistent with the component models from which it is formed.

32 Claims, 7 Drawing Sheets

OTHER PUBLICATIONS

Pininski et al., "A Risk and Decision Model for the Optimal Investment in Plant Protection", Portland International Conference o Management and Technology, Jul. 1997.*

Amir et al., "Identifying a Time–dependent Covariate Effect in the Additive Risk Model", Retrieved from the Internet: http://citeseer.ist.psu.edu/336826.html.*

Chen et al., "An Integrative Approach to Modeling the World Equity Market", Citeseer online database, Jun. 2000.*

Darrell Duffie, and Jun Pun; *An Overview of Value at Risk*; The Journal of Derivatives; Spring 1997.

UBS Brinson; *Quarterly Investment Strategy*; Institutional Asset Management; Jun. 30, 1999.

M. Aked, C. Brightman, and S. Cavaglia; *On the Increasing Importance of Industry Factors: Implications for Global Portfolio Management*; Dec. 7, 1999.

Stefano Cavaglia, Dimitris Melas, George Tsouderos and Keith Cuthbertson; *Industrial Action*; Risk; May 1995.

Stefano Cavaglia, Dimitris Melas and Osamu Miyashita; *Efficiency Across Frontiers*; RISK; no date given.

Stefano Cavaglia, Dimitris Melas, George Tsouderos and Keith Cuthbertson: *Industrial Action*; RISK 9, no date given.

Richard Roll; *Industrial Structure and the Comparative Behavior of International Stock Market Indexes*; Anderson Graduate School of management; Jun. 1990.

Lucie Chaumeton and Kevin Coldiron; *Equity Reearch: gobal Companies—a New Asset Class?*; Feb. 1999.

Bruno H. Solnik; *Why Not Diversify Internationally Rather than Domestically?*; Financial Analysts Journal. Jul.–Aug. 1974.

Donald R. Lessard; *World, Country, and Industry Relationships in Equity Returns*; Financial Analysts Journal; Jan.–Feb. 1976.

Robin Brooks and Luis Catao; *The New Economy and Global Stock Returns*; International Monetary Fund; Dec. 2000.

S. Cavaglia, C. Brightman, and M. Aked; *On the Increasing Importance of Industry Factors: Implications for Global Portfolio Managament*; Forthcoming: Financial Analyst Journal; Mar. 21, 2000.

M. Aked, C. Brightman, and S. Cavaglia; *The Importance of Global Industry Factors*; Sep. 30, 1999.

Donald R. Lessard; *World, National, and Industry Factors in Equity Returns*; Journal of Finance; May 1974.

Martin Drummen and Heinz Zimmermann; *The Structure of European Stock Returns*; Financial Analysts Journal; Jul.–Aug. 1992.

Richard Roll; *Industrial Structure and the Comparative Behavior of International Stock Market Indices*; The Journal of Finance; Mar. 1992.

Andrew Rudd; *F. Narrow Markets and Global Stocks*; Equity Research Seminar; Barra Inc.;1999.

Vinod Chandrashekaran; *H. New Ideas in Risk Forecasting*; $22^{nd}$ Annual Equity Research Seminar; Barra, Inc.; Jun. 14–17, 1998.

*P. Approaches to Global Equity Risk*; Equity Research Seminar; Barra, Inc.; 1996.

Kenneth Hui; *H. New Approaches to Global Equity Risk*; $21^{st}$ Annual Equity Research Seminar; Jun. 15–18, 1997.

*N. International Specific Risk*; Equity Research Seminar; Barra, Inc.; 1992.

Baca, Sean P., Barge, Brian L., and Weiss, Richard A.; *The Rise of Sector Effects in Major Equity Markets*; Association for Investment Management and Research 2000.

* cited by examiner

METHOD AND APPARATUS FOR AN INTEGRATIVE MODEL OF MULTIPLE ASSET CLASSES

BACKGROUND OF THE INVENTION

1. Technical Field

The invention relates to risk analysis. More particularly, the invention relates to an integrative method for modeling assets from many different asset classes. It is illustrated by application to the world equity market, when each country or regional equity market may be treated as an asset class.

2. Description of the Prior Art

All my fortunes are at sea.

My ventures are not in one bottom trusted, nor, to one place; nor is my whole estate upon the fortune of this present year.

William Shakespeare, The Merchant of Venice (1598)

Shakespeare reminds us that the perils of investment have been with us always. Likewise, the insight that these risks can be reduced through diversification is ancient. A very recent idea, however, is that the risks can be measured and the degree of diversification can be optimized. This new insight rests on a technological advance—the risk model—which itself rests on the technological revolution produced by the computer and, more specifically, by the silicon chip.

Within the world of risk modeling there has, until recently, been a need to compromise on objectives. As long as one's focus was confined to securities within a single market, U.S. equities say, detailed analyses have been possible. When one's perspective broadens to consider equities from around the world, currencies, etc., the depth of analysis contracts. Fundamentally this compromise between depth and breadth has been necessitated by the limitations of computing technology. In the last few years, however, these limitations have been much reduced.

It would be desirable to harness the recent increase in computing power to achieve an analysis of global asset risk which is both broad and deep.

Fundamental Concepts

The Covariance Matrix

A standard approach to characterizing financial risk is to measure the variance of the return series. Let $r_i(t)$ be the return to asset i in period t and define the asset-to-asset covariance matrix $\Omega$ by $$\Omega_{ij}(t)=cov(r_i(t),r_j(t))$$

where cov( ) is the covariance operator. Suppose h is the vector whose component $h_i$ gives the fraction of wealth invested in asset i by a particular portfolio. Then the variance of the portfolio return is given by $$h'\Omega h$$

More generally if $h_1$ and $h_2$ are vectors defining distinct portfolios, then the covariance of the returns to those portfolios is given by $$h_1'\Omega h_2$$

This reduces the risk analysis of a portfolio to the problem of determining a good estimate $\hat{\Omega}$ of the asset-by-asset covariance matrix $\Omega$.

In the last 25 years, there has been rapid growth in types of assets, such as options, where the variance may not be an adequate description of risk. In these cases, there is a set of underlying variables, such as underlying asset prices, whose riskiness is captured by their variances. Then $\Omega$ is the covariance matrix of the underlying variables, such as underlying asset prices. For expositional simplicity, and because the variance does provide a first measure of risk, we will use portfolio covariance as a risk measure and use $\Omega$ to denote the asset level covariance matrix. The simplest estimator $\hat{\Omega}$ is the historical covariance matrix $$\Omega_{ij}^{hist}(t)=cov(\{r_i(u)r_j(u)\}_{u=t,1})$$

An important practical point is that the number of periods t entering into this estimate is constrained by economic realities. Let T denote the total length of time over which returns are observed and let $\Delta$ denote the observation interval. Then $t=T/\Delta$. In general T is limited by two circumstances. First, assets have finite lives. Second, the economy itself is evolving and this evolution limits the relevance of data from the distant past. It is desirable, though not essential, for T to be at least five years. For the risk horizons of interest in a portfolio management context, e.g. from one quarter to a few years, a rule of thumb is that the observation interval $\Delta$ is best set at a one month horizon. Taking T at five years and $\Delta$ at one month results in the number of periods t being 60. The choice of 60 is not a hard number, but it represents a reasonable and necessary compromise.

The statistical properties of the estimator $\hat{\Omega}$ depend crucially on two parameters: the number of periods t in the estimate and the number of assets, N, covered by the estimate. If N>t then we may find portfolios h such that $$h'\hat{\Omega}h=0$$

over the sample period. Such portfolios appear to be risk free, but in fact are not. Technically this condition is expressed by saying that $\hat{\Omega}$ fails to be positive definite. If a covariance matrix which is not positive definite is used for portfolio construction there will be a strong tendency to buy into the apparently risk free portfolios. The result is a severely biased risk estimate, with realized risks proving significantly higher than forecast risks. For this reason a positive definite covariance matrix is a basic requirement, and thus one requires t>N. Econometric considerations limit t to approximately 60, while practical applications may require N on the order of 1000. Thus, the historical asset-by-asset covariance matrix is of only limited practical utility.

The Factor Model

The limitations of the historical covariance matrix motivate the search for a more robust estimator of the asset covariances. The standard solution is to invoke a factor model. A factor model is a linear model for asset returns such that $$r_i(t) = \sum_{j=i}^{m} X_{ij}(t)f_j(t) + \varepsilon_i(t)$$

where $X_{ij}(t)$ is termed the exposure of asset i to factor j, $f_j(t)$ is termed the return to factor j and $\epsilon_j(t)$ is termed the specific return to asset i. The returns need not be linear in the factors, as in the case of options. Our interest is in developing a covariance matrix for factors across many asset classes and the linearity assumption does not impact the interest in any manner: Non-linear instrument may by valued directly given factor realization. For portfolio risk analysis, the linear approach is a widely-used first order approximation which greatly speeds up computations. It is further assumed that the factors $f_j$ capture all common sources of return between assets, or equivalently that $$cov(f_j(t),\epsilon_i(t))=0$$

for all factors $f_j(t)$ and specific returns $\epsilon_j(t)$ and that $$cov(\epsilon_i(t), \epsilon_k(t)) = 0$$

for distinct assets i and k. In this case with a bit of algebraic manipulation one can show $$\Omega = XFX^\tau + \Delta \text{ where}$$

$$F_{ij}(t) = cov(f_i(t), f_j(t)) \text{ and}$$

$$\Delta_{ij}(t) = cov(\varepsilon_i(t), \varepsilon_j(t))$$

$$= \begin{cases} var(\varepsilon_i) & \text{if } i = j \\ 0 & \text{otherwise} \end{cases}$$

F is the common factor covariance matrix, and $\Delta$ is the (diagonal) matrix of specific risk. We estimate the quantities F and $\Delta$ historically.

The statistical properties of this model may be quickly summarized, based on our analysis of the sample covariance matrix. Since all assets have some specific risk, $\Delta > 0$, this insures that $$\hat{\Omega}^{fact} = X\hat{F}^{hist}X^\tau + \Delta^{hist}$$

will be positive definite. The accuracy of the common factor risk forecasts $\hat{F}^{hist}$ depend on t in the average case and on the quality ratio t/m in the worst case, where m is the number of factors.

Another source of error in the factor model derives from error in the factor structure, for instance due to omission of an important factor. This source of error can be controlled for empirically. For instance, the importance of the smallest included factor gives an estimate of the likely importance of the largest missing factor, if a systematic process for constructing the factor model has been followed.

Factor Modeling Techniques

There are two basic approaches for generating factor models, which are termed the exploratory and confirmatory approaches, respectively. The exploratory approach assumes that the returns are generated by a factor model but that nothing is known about the factor model $$r = Xf + \epsilon$$

Various statistical techniques can then be applied to simultaneously estimate $X_i$ and $f(t)$ from the data $r_i(t)$. In this method X captures all the cross-sectional variation in i and $f(t)$ captures all the temporal variation. Even so, however, X and $f(t)$ are not uniquely defined, but rather are determined only up to a rotation of the exposures. Thus, the factors extracted by this technique are not directly interpretable. Interpretability of factors is an important consideration if a risk model is to be used for active portfolio management. In active management risks are deliberately taken in the effort to earn compensatory return. Thus, judgments must be formed as to whether or not one is willing to take on risk along a particular dimension. If the dimension is a statistical construct without an economic interpretation, there is little basis from which to form such judgments. It is usual in exploratory factor analysis to apply a rotation to the extracted factors in the hopes of arriving at an interpretation of the factors. The value of this interpretation, however, relies entirely on the analyst's judgment.

The confirmatory factor approach assumes that a priori information is available about the factor structure. In the returns based approach one assumes that the factor returns $f_j(t)$ are known. Then the exposures $X_{ij}(t)$ are found by regressing the asset returns on the factor returns. For instance, the market model assumes a single factor return, namely the market return m(t) in excess of the risk free rate $r_0(t)$ and it determines an asset exposure, the historical beta $\beta^{hist}$ by regressing asset returns in excess of the risk free rate on the market excess return $$r_i(t) - r_o(t) = \alpha_i + \beta_i^{hist}[m(t) - r0] + \epsilon_i(t)$$

A limitation of the returns based approach is that the estimated factor exposures may not be very interpretable. A variant, known as style analysis, attempts to correct this defect by carrying out a least squares estimation in which the exposures are restricted to lie in an a priori reasonable range. For instance, restricting the exposures to lie between 0 and 1 and to sum to 1 allows them to be interpreted as weights which describe how the factor returns are mixed together to best approximate the asset return. Note that if the data do not conform to the imposed restrictions then in general the condition.

$$cov(f_i(t), \epsilon_j(t)) = 0$$

will fail to hold, so style analysis cannot simultaneously guarantee interpretable exposures and a consistent factor structure.

In contrast to the returns based analysis, the exposure based approach to confirmatory factor analysis assumes that the exposure matrix X is known a priori. The factor returns $f(t)$ are then estimated by regressing the asset returns on the exposures. The exposure approach differs from other factor modeling methods in that 1) the interpretive structure is unambiguous; and
2) the exposure matrix can more readily vary dynamically through time.

However one generates a factor structure, one is faced with the problem of assessing its adequacy. For exploratory techniques one is guaranteed to find a structure that meets the basic assumption (1) and (2) of the factor model over the time period in which the model is estimated. The essential assessment then is whether the factor exposures estimated in this way remain stable in subsequent time periods. For returns based confirmatory factor analysis, stability of the factor exposures is again the basic criteria of success. For confirmatory analysis, by contrast, the technique only guarantees only that property (1) will hold. Thus, a test of the model is verifying how well property (2) holds—i.e. are the specific returns of distinct assets uncorrelated within measurement error? It is an advantage of the confirmatory methodology that this check of the model's adequacy may be made on the estimation data itself. By contrast, the exploratory method requires data subsequent to the estimation data to arrive before the internal consistency of the model can be assessed.

Cross Asset Class and Single Asset Class Modeling

When analyzing assets in a single asset class, the most accurate risk predictions are obtained by identifying the factors appropriate to that asset class and estimating a corresponding factor model. The number of factors and length of factor realization history is almost certain to be different among the various classes. In addition, the precision of the modeling is likely to vary by asset class as is the richness of the factor structure. Each asset class is likely to have different accessibility of individual asset data so that varying levels of granularity imply that certain items of information may be available within one class but not available within another.

Confirmatory factor analysis for equities in a single country reveals that equity returns are driven by industry and style related factors. Industry related factors are self-explanatory: each firm functions within a single industry or across multiple industries, and the exposure of a firm to different industries may be computed by using a combination of sales, assets, and income from the different industries. Style related factors are based on firm fundamentals, such as size, growth, or relative trading activity, and exposure to style based factors are computed using fundamental accounting information, e.g assets, or market information, e.g. capitalization, trading volume. The prevalence of different industries, the availability of fundamental and market data, and the local behavior of the market then determine the final factor structure that is used for equities in a single country.

For fixed income securities, the set of factors are default free (sovereign) or high grade (swap) interest rates and spreads for lower grade instruments. The first set of factors is generally described by a set of zero coupon yields, or by the first three principle components of the set of zero coupon yields. Depending on the availability of data, the spread factors can be divided into sector and rating related spreads. In the U.S., for example, it is possible to get a fairly rich set of spread factors because of a long history of data, whereas such a history may not be available for other markets.

When integrating across many assets classes, it has in the past been difficult to work with the factors from the single asset class models, particularly for equities. The problem, discussed in detail below, is simply that there are too many factors, differing factor histories, and different types of statistical analyses that may be applied to each asset class. The natural simplification, which eliminates the need for aggregating different types of model, is to impose a common factor model structure across all asset classes. For example, one could impose a single factor model so that the aggregation process requires only the estimation of the correlation between the various factors, while at the individual asset level one has only to estimate asset exposures and residual risk. As described below in detail, this has been past practice when modeling global equities. This greatly simplifies the aggregation task but either leaves the portfolio manager with an inferior model or yields inconsistent results between the various levels within the firm hierarchy, neither of which result is necessary, or desirable.

To motivate our solution to the cross-asset class problem, we next illustrate the natural tension that arises between cross and within asset class risk analysis by focusing our attention on the details of modeling of global and single country equities. We then show how the invention solves the tension by providing an approach that integrates single asset class models into an aggregate asset class model. Again, this resolution is illustrated by a detailed application to the global equity market.

Prior BARRA Research

The existing approach to global equity factor modeling is closely based on the Grinold, Rudd, and Stefek model of 1989. In this approach, local market residual returns $$\tilde{r}_i(t) = r_i(t) - rf_i(t) - \beta_i(t) m_i(t)$$

are calculated, where $r_i(t)$ is the return to asset i in local currency
$rf_i(t)$ is the risk free rate for the local currency of asset i
$\beta_i(t)$ is the beta from a five-year CAPM regression
$m_i(t)$ is the local capitalization weighted equity index return The market residual returns are then fit to an exposure based factor model of the form $$\tilde{r}_i(t) = \sum_{j=1}^{N_i} X_{ij}^1(t) f_j^1(t) + \sum_{k=1}^{4} X_{ik}^2(t) f_k^2 + \varepsilon_i(t)$$

Here the $X_{ij}^1(t)$ are $N_i$ industry exposures where for every asset i there is a unique j such that $X_{ij}^1(t)=1$ and for all $k \neq j X_{ik}^1(t)=0$ The quantities $f_j^1(t)$ are interpreted as returns to globally defined industries. In addition, Barra's global equity model contains a set of style factors. These are embodied in $X_{ik}^2(t)$, which are four statistical characterizations of asset i, termed SIZE, SUCCESS, VALUE and VARIABILITY IN MARKETS. These measures are based on asset characteristics normalized against the local market. The estimation of the Barra model is carried out over approximately 2000 assets, drawn from some 25 developed markets. The exact composition of the estimation universe varies through time. The commercial version of this model is known as the Global Equity Model. It exists in two different versions distinguished by slightly different industry classification schemes and estimation universes.

Since the original formulation of the Global Equity Model we have learned much about global equities:

1) The power of exposure based factor analysis has been confirmed. Exploratory factor analysis and returns based analysis have generally confirmed findings first achieved with the Global Equity Model without generating fundamentally new insights themselves (Drummen and Zimmerman 1992, Heston and Rouwenhorst 1995). At the same time the limitations of returns based analysis have been convincingly documented (Hui 1996).

2) All studies have found country factors to be important. However, the most recent studies find country factors to be of declining importance in Europe (Becker, Connor and Curds 1996, Freimann 1998, Connor and Herbert 1998). In discussions about the relative importance of country and global industry factors it is accordingly useful to distinguish the European situation from the rest of the world.

3) The Global Equity Model found global industries to be important explanatory concepts. However, other studies suggest that this factor structure may be partially an analyst construct rather than an organic feature of asset returns. From a principal component analysis only the energy sector emerges as a clearly global industry (Hui 1995). Regional and country industries are found to carry substantially more explanatory power than global industries (Stefek 1991, Becker, Connor and Curds 1996). Just within Europe, continental and UK industries are found to be separate concepts (Connor and Herbert 1998).

4) The importance of different factors fluctuates through time (Rouwenhorst 1999). Recently industry and size factors have been of considerable importance (Chandrashekaran, Hui and Rudd 1999; Cavaglia, Brightman and Aleed 2000; Bach, Garbe and Weiss 2000).

5) A number of studies have emphasized that global equities exhibit considerable inhomogeneities. Simple differences in available data handicap a number of studies, e.g. Chaumeton and Coldiron 1999, Chandrashekaran, Hui and Rudd 1999. Specific risks are best understood in a local context (Grinold and Drach 1992). Local markets exhibit distinct behaviors of market risk (Hui 1997).

Pricing appears to be local (Hui 1994). Regional concepts appear to be valid in some but not all parts of the world (Hui 1996). Local market factor structures differ (Hui 1997). Attempts to define a subuniverse of truly global companies appear problematic (Chaumeton and Coldiron 1999, Chandrashekaran, Hui and Rudd 1999). The UK appears to be only partially integrated into Europe (Connors and Herbert 1998).

6) Risk indices are found to have high marginal explanatory power per factor (Hui 1995). However they have been entirely ignored or relatively underutilized in most studies. Compared to single country factor models, fundamental, i.e. accounting, data are underutilized in the global setting. The principal difficulty is variations in disclosure and accounting standards around the globe.

Synthesizing all of this information, we are led to a new vision of global equities. Whereas the Global Equity Model saw global equities as a homogeneous group caught in a simple factor structure, we now see each local market as the homogeneous grouping with different markets linked together into a global matrix by various regional and global effects. The natural realization of this vision is to fit a factor model to each local market. The local models can be customized to each market to capture its special features and to best exploit the available data. The local analysis must then somehow be integrated into a global analysis. The work of Hui has been pointing in this direction since 1995. How to achieve the integration of local models has, however, been an elusive point. It would be advantageous to resolve this difficulty.

SUMMARY OF THE INVENTION

The invention provides a method and apparatus for combining two or more risk models to create a risk model with wider scope than its constituent parts.

The method insures that the combined risk model is consistent with the component models from which it is formed.

Starting with:
1. Let $C_1$ denote the class of algorithms for constructing estimates of covariance matrices from time histories of data.
2. Let $C_2$ denote the class of asset classes.
3. For x in $C_2$ let $C_3(x)$ denote the class of multi-factor risk models for x. For y in $C_3(x)$ denote its parts as follows:
   Factor exposures $X(y,t)$; at time t
   Factor returns $f(y,t)$; at time t
   Specific covariance matrix $D(y,t)$ at time t.
   Factor covariance matrix $F(y,t)$ at time t.
   The following components are given:
1. Two or more asset classes $x_1, \ldots, x_n$. Let x denote the asset class which is the union of these given asset classes.
2. For each asset class $x_i$ a risk model $y_i$ in $C_3(x_i)$ is given.
3. Let $Y(t)$ be such that the decomposition $$\underbrace{\begin{pmatrix} f(y_1, t) \\ f(y_2, t) \\ \vdots \\ f(y_N, t) \end{pmatrix}}_{f(t)} = \underbrace{\begin{pmatrix} Y_1(t) \\ Y_2(t) \\ \vdots \\ Y_N(t) \end{pmatrix}}_{Y(t)} g(t) + \underbrace{\begin{pmatrix} \phi_1(t) \\ \phi_2(t) \\ \vdots \\ \phi_3(t) \end{pmatrix}}_{\phi(t)}$$

which results in residuals $\phi(t)$ such that correlation $(\phi_i, \phi_j)$ is nearly zero if $i \neq j$.

Construct a risk model for x as follows:
1. Form $X(t) = \text{diag}(X(y_1, t), \ldots, X(y_n, t))$ (some detail suppressed here, see below for more details).
2. Form $D(t) = \text{diag}(D(y_1, t), \ldots, D(y_n, t))$.
3. Apply a method from $C_1$ to estimate a covariance matrix $G(t)$ from the history of $g(t)$s.
4. Apply a possibly different method from $C_1$ to estimate a covariance matrix $\Phi(t)$ from the history of $\phi(t)$s.
5. Then $X(t)[Y(t)G(t)Y(t)' + \Phi(t)]X(t)' + D(t)$ is a risk model for x.

Insure the risk model in Step 5 above is consistent with each component, asset class risk model as follows:
1. Let $F_1(t)$ be the block diagonal matrix obtained from $Y(t)G(t)Y(t)' + \Phi(t)$ by setting all elements to zero except those of the blocks corresponding to each asset class. Each block represents the covariance among the factors explaining risk for a particular asset class.
2. Let be $F_2(t)$ the block diagonal matrix whose diagonal blocks contain the asset class factor covariance matrices, $F(y_i, t)$ in the same order as they appear in $F_1(t)$; the off-block diagonal elements are zero.
3. Given a real symmetric positive semi-definite matrix M, let $M^{1/2}$ denote a square root of M so that $M^{1/2}[M^{1/2}]' = M$. There may be several choices for $M^{1/2}$. Let $M^{-1/2}$ denote the inverse of $M^{1/2}$, or in the event that the inverse does not exist, let $M^{-1/2}$ be the pseudoinverse of $M^{1/2}$.

Then $X(t)[F_2^{1/2}F_1^{-1/2}(Y(t)G(t)Y(t)' + \Phi(t))[F_2^{1/2}F_1^{-1/2}]']X(t)'$ is a risk model that is consistent with the component asset class models.

DETAILED DESCRIPTION OF THE INVENTION

Figure 1:
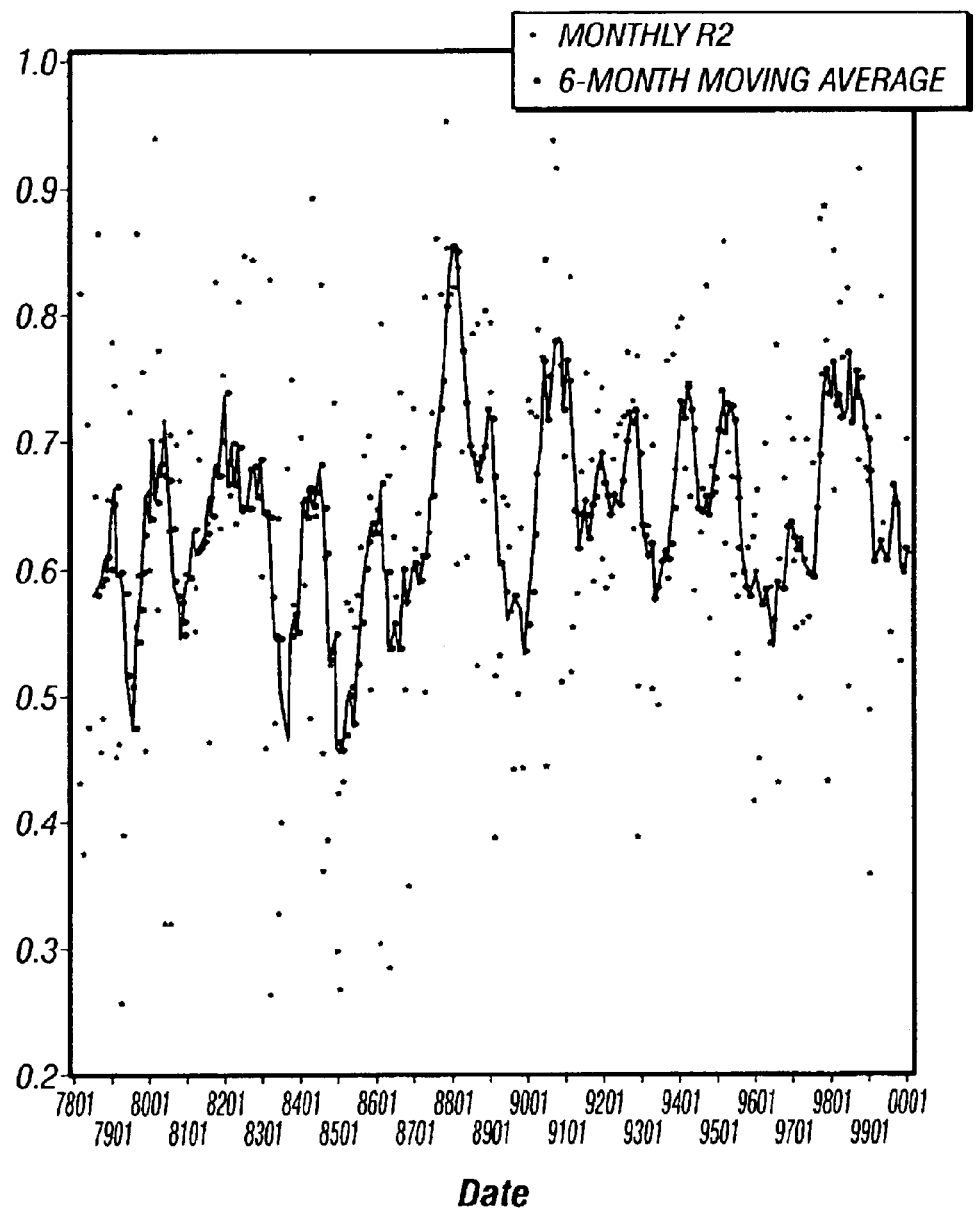
FIG. 1 is a graph which shows a monthly model $R^2$.

Construction of a Global Analysis
Combination of Models

One goal of the invention is to integrate factor models of local markets into a global analysis. For notational simplicity let us first focus on the problem of integrating just two models. Specifically, let $(X^1, F^1, \Delta^1)$ and $(X^2, F^2, \Delta^2)$ be two different factor models. In other words, if $r^i$ is a vector of returns from market i then $r^i(t) = X^i(t)f^i(t) + \epsilon^i(t)$ where $\text{cov}(f^i(t), f^i(t)) = F^i(t)$ and $\text{cov}(\epsilon^i(t), \epsilon^i(t)) = \Delta^i(t)$ We may form new entities $$r(t) = \begin{pmatrix} r^1(t) \\ r^2(t) \end{pmatrix}$$

$$X(t) = \begin{pmatrix} X^1(t) & 0 \\ 0 & X^2(t) \end{pmatrix}$$

and fit the model $$r(t) = X(t)f(t) + \epsilon(t) \text{ then}$$

$$f(t) = \begin{pmatrix} f^1(t) \\ f^2(t) \end{pmatrix}$$

and $$\varepsilon(t) = \begin{pmatrix} \varepsilon^1(t) \\ \varepsilon^2(t) \end{pmatrix}$$

If we assume the factor exposures capture all sources of common return between any two assets then the covariance matrix $$\Delta(t) = cov(\epsilon(t), \epsilon(t))$$

continues to be diagonal and in fact $$\Delta(t) = \begin{pmatrix} \Delta^1(t) & 0 \\ 0 & \Delta^2(t) \end{pmatrix}$$

The covariance matrix of common factor returns $$F(t) = cov(f(t), f(t)) \text{ is}$$

$$F(t) = \begin{pmatrix} F^1(t) & F^{12}(t) \\ F^{12}(t)^t & F^2(t) \end{pmatrix}$$

where $F^1(t)$ and $F^2(t)$ are as given in the local market models and $$F^{12}(t) = cov(f^1(t), f^2(t))$$

is a new piece of data. Thus, $(X(t), F(t), \Delta(t))$ constitutes a factor model for the union of the two local markets. In particular, the asset-by-asset covariance matrix $\Omega(t)$ for the combination of the two markets is given by $$\Omega(t) = X(t)F(t)X(t)^t + \Delta(t)$$

Given $\Omega(t)$, risk analysis may be performed on the union of the two markets exactly as it is performed on each market separately. Hence, in summary, we see that the only new piece of information required to join $(X^1, F^1, \Delta^1)$ and $(X^2, F^2, \Delta^2)$ into $(X(t), F(t), \Delta(t))$ is $F^{12}(t)$.

Let us consider how we might estimate $F^{12}(t)$. The simplest approach is to form the sample covariance matrix $$\hat{F}^{12}(t) = cov\left[\{f^1(u), f^2(u)\}_{u=1}^t\right]$$

For combining just two models this approach might be adequate. However, the presently preferred embodiment of the invention may be used to combine 50 or so models, with each model containing, e.g. 40 factors. Thus, we could face up to 2000 factors. Computing a 2000 times 2000 sample covariance matrix from limited time series data leads to degenerate results.

In short, combining factor models has led us to exactly the same problem we faced when we tried to compute asset-by-asset covariance matrices directly. In the asset case we saw that the solution was a factor model. Hence, we turn to a factor model to solve our present difficulty. In particular, we identify factors $g(t)$ that capture the covariance between $f^1(t)$ and $f^2(t)$. Let $Y(t)$ be the exposures of $$f(t) = \begin{pmatrix} f^1(t) \\ f^2(t) \end{pmatrix} \text{ to } g(t).$$

Then $$f(t) = Y(t)g(t) + \phi(t)$$

Then we can form $$G(t) = cov(g(t), g(t))$$

$$\Phi(t) = cov(\phi(t), \phi(t))$$

and take as our initial estimate of $F(t)$ $$\tilde{F}(t) = Y(t)G(t)Y(t)^t + \Phi(t)$$

Assuming that the exposures in $Y(t)$ capture all sources of common covariance between $f^1(t)$ and $f^2(t)$, $\Phi(t)$ is a block diagonal matrix with the form $$\Phi(t) = \begin{pmatrix} \Phi^1(t) & 0 \\ 0 & \Phi^2(t) \end{pmatrix}$$

Let $$H(t) = Y(t)G(t)Y(t)^t$$

which we write in block form as $$H(t) = \begin{pmatrix} H^1(t) & H^{12}(t) \\ H^{12}(t)^t & H^2(t) \end{pmatrix}$$

similarly we write $$\tilde{F} = \begin{pmatrix} \tilde{F}^1(t) & \tilde{F}^{12}(t) \\ \tilde{F}^{12}(t) & \tilde{F}^2(t) \end{pmatrix}$$

Then on the diagonal blocks $$\tilde{F}^i(t) = H^i(t) + \Phi^i(t)$$

and on the off-diagonal block $$\tilde{F}^{12}(t) = H^{12}(t)$$

Assuming we have found the correct factor structure, as the sample size goes to infinity, one has $\tilde{F}^i(t)$ converge to $F^i(t)$. With finite samples, however, this convergence may be incomplete. We may rescale $\tilde{F}$ to bring its diagonal blocks into agreement with the blocks $F^i$ provided by the local models. Let $M^{1/2}$ indicate the singular value square root of the matrix M. Introduce $$R = \begin{pmatrix} (F^1)^{\frac{1}{2}}(\tilde{F}^1)^{-\frac{1}{2}} & 0 \\ 0 & (F^2)^{\frac{1}{2}}(\tilde{F}^2)^{-\frac{1}{2}} \end{pmatrix}$$

Then $$\hat{F} = R\tilde{F}R^t$$

is an estimator of F such that its diagonal blocks $\hat{F}^i$ are identical with the blocks provided by the local market model. Note that as $\tilde{F}^1$ converges to $F^i$ the resealing matrix R converges to the identity. We take $\hat{F}$ as our final estimate of F. In particular its off-diagonal block $\hat{F}^{12}$ is $$\hat{F}^{12} = (F^1)^{\frac{1}{2}}(\tilde{F}^1)^{-\frac{1}{2}}\tilde{F}^{12}(\tilde{F}^{2t})^{-\frac{1}{2}}(F^2)^{\frac{1}{2}}$$
$$= (F^1)^{\frac{1}{2}}(H^1 + \Phi^1)^{-\frac{1}{2}}H^{12}(H^2 + \Phi^2)^{-\frac{1}{2}}(F^2)^{\frac{1}{2}}$$

To summarize the discussion, we saw that $F^{12}$ was the information required to combine the two local market models and that its estimator $\hat{F}^{12}$ can be constructed from the given data $F^1$ and $F^2$ plus the additional data H and $\Phi$ derived from the factor model $$f(t) = Y(t)g(t) + \phi(t)$$

The foregoing describes a completely general approach to combining two factor models. The foregoing technique, however, is not restricted to combining just two models. One could combine any number of local market models ($X^i(t)$, $F^i(t)$, $\Delta^i(t)$) given a suitable factor model (Y, G, $\Phi$). Thus, we have in fact described a mechanism for modeling the entire universe of investable assets. The essential property of this construction is that it integrates the detailed analysis of a local market into a global analysis. In particular, if h is a portfolio which happens to lie in a local market, then the risk analysis of h conducted in the local context is identical with the analysis of h conducted in the global framework.

Local Models

Let us apply the above discussion to the formulation of a global equity analysis. Following the formulation of the Global Equity Model we can decompose the excess return $r_{i, num}(t)$ to asset i in numeraire currency into its local excess return $r_{i, loc}(t)$ and its currency return $r_{i, cur}\text{cur}(t)$ as $$r_{i,num}(t) = r_{i,loc}(t) + r_{i,cur}(t)$$

To achieve a global analysis we require local models for the equity asset returns and for the currency returns. Fortunately, we have a large number of such models already constructed. The following discussion briefly describes these models.

For the local analysis of an equity market we employ a factor structure containing two types of factors: industries and risk indices. The definition of the industry factors begins with the choice of an industrial classification system. While the precise definitions are usually chosen so as to be appropriate to the local market, the categories are sufficiently broad and distinct as to be largely similar from country to country. Once the classification system is defined, each company is assigned an industry exposure. Always the industry exposures of a company sum to not more than one. In some models, exposures are zero-one variables, so a company has an exposure of one to one industry and zero to all others. In other models, companies are exposed to multiple industries. In this case, the industry exposures are assigned to capture the importance of that industry to the company. The assignment is usually made based on a combination of accounting data, i.e. sales in a business segment, and a style analysis of company returns against industry index returns.

The risk indices capture other aspects of a security which are useful to understanding its return pattern. Examples of such indices are measures of size, liquidity, value, yield, exposure to foreign trade, blue chip quality, membership in indices on which futures contracts trade, past market performance, and volatility. Each local model contains a set of risk indices appropriate to that market and with definitions more or less specialized to the data available in that market. The construction of the indices follows a general pattern however. First a concept is identified, e.g. size. Then specific pieces of data (known as descriptors) are identified which have a bearing on the concept, for instance market capitalization or revenues. The descriptors are then combined to form a factor exposure which seems maximally informative about return patterns. For instance, one might take a linear combination of the descriptors where the coefficient attached to a descriptor could be interpreted as a measure of how accurately the descriptor realizes the concept. The need to handle the problems of missing data, outliers, and changing accounting definitions through time tends to make the details of factor exposure construction rather complex. Continuous factor exposures are usually standardized against the local asset universe, a step which makes the factor exposures comparable from factor to factor. Discrete factor exposures, e.g. a zero-one variable indicating membership in an index portfolio, are usually left unstandardized. Factor exposures are revised as new information arrives. For instance, if a company sells a division its industry exposures may differ after that point from those before that point.

Once the factor exposure matrix X has been defined, the factor returns and specific returns are measured through the regression $$r(t) = X(t)f(t) + \epsilon(t)$$

Different models generally employ a weighting scheme suitable to the local market, e.g. capitalization weighting or GLS weights. From returns data one constructs the covariance matrices F(t) and $\Delta$(t). In some models, however, there is considerable detail to this construction.

In investigating factor structures we have found them to differ along time and capitalization dimensions. Thus, in the U.S., for instance, we actually estimate three separate models—a model of large capitalization stocks based on monthly returns, a model of large capitalization stocks based on daily returns, and a model of small capitalization stocks based on monthly returns. In Europe, we estimate models for many of the individual national markets. However, we also estimate a pan-European model. As we have noted, a factor model should be fit over a homogenous group of assets. There are degrees of homogeneity and how much homogeneity a group of assets exhibits depends in part on one's perspective. For some investors, European equities as a whole currently represent a homogenous group, while other investors follow strategies which continue to see the national markets as the primary homogenous groups.

Our global analysis is constructed by combining local models. The wealth of local models gives us considerable flexibility in producing a global analysis. For instance, we can combine local models estimated over daily time horizons to achieve a global analysis suitable for short-term risk assessment. Alternatively, we can combine local models estimated for small capitalization stocks to produce a global small capitalization analysis. In treating European assets we can choose to combine several nationally focused local models, or instead we can use our European region model.

In addition to local equity models we also require a model of currency returns. Our currency model is an example of a degenerate factor model in that it has one factor per currency. In other words, the exposure matrix X is the identity, so the asset returns equal the factor returns and the specific returns are zero. The subtlety of the model comes in how the factor covariance matrix is constructed. We write $$F_{ij} = \sigma_i \sigma_j \rho_{ij}$$

where $\sigma_i$ is the volatility of currency i and $\rho_{ij}$ is the correlation between currencies i and j. The volatilities $\sigma_i$ are estimated from GARCH models chosen appropriately for each currency model fit over fairly high frequency data. The correlations are estimated by an exponentially weighted moving average method applied to lower frequency data. Additional detail has been provided by Goldberg (see *Currency Risk Modeling*, Barra 2000 Research Seminar, Section C).

The Equity Covariance Structure
Methodology

Given the local models, our task now is to construct the global model which unifies them. Hence, the first order of business is to determine the global factor structure Y. We focus first on the factors relating local equity markets. Our research on global equity factors has already identified a number of possible factors (See Table 1):
1. Country factors and a world factor;
2. Global Industry factors;
3. Global risk under factor;
4. A global macro-economic factor.

The global macroeconomic factor is a new element given the current structure of equity risk models. It is formed from two descriptors. The first descriptor is the country's inflation rate standardized cross-sectionally. The second descriptor is the ratio of the country's current account to its reserve bank holdings of foreign exchange, also standardized cross-sectionally. The factor is defined as the difference of these two descriptors standardized cross-sectionally. Thus, this factor is sensitive to either internal or external monetary disequilibrium. Reflecting its definition, we term this factor Gloom & Doom.

TABLE 1

Final Factor Selection

| Number | Type | Factors |
|---|---|---|
| 1 | World Equity Factor | World |
| 22 | Countries | Australia, Brazil, Canada, France, Germany, Greece, Hong Kong, Indonesia, Japan, Korea, Malaysia, Mexico, Netherlands, New Zealand, Singapore, South Africa, Sweden, Switzerland, Taiwan, Thailand, United Kingdom, United States |

TABLE 1-continued

Final Factor Selection

| Number | Type | Factors |
|---|---|---|
| 19 | Global Industries | Airlines, Automobiles, Banks, Beverage, Tobacco, Electronics, Energy, Financial Services, Food, Health, Information Technology, Insurance, Media, Mining, Precious Metals, Property, Raw Materials, Technology, Telephone, Utilities |
| 3 | Risk Indices | Size, Momentum, Volatility |
| 1 | Macro Economic Factor | Gloom & Doom |
| 46 | Factors Total | |

Having determined the factor concepts, we must next specify the factor loadings. Let $m_i(t)$=return to market portfolio of country i $f_j^i(t)$=return to $j^{th}$ factor of country i $\beta_j^i(t)$=factor beta of $f_j^i(t)$ with respect to $m_i(t)$ predicted by the local model for country i $D_i^1(t)=1$ for all i $D_i^2(t)$=the Gloom & Doom exposure for country i $$D_{ijk}^3(t) = \begin{cases} 1 & j \text{ is an industry in the } i^{th} \text{ country belonging to the } k^{th} \text{ global industry} \\ 0 & \text{Otherwise} \end{cases}$$

$$D_{ijk}^4(t) = \begin{cases} 1 & j \text{ is a risk index in the } i^{th} \text{ country belonging to the } k^{th} \text{ global risk index} \\ 0 & \text{Otherwise} \end{cases}$$

We have in essence two models. The first model is $$m_i(t) = D_i^1(t)\tilde{g}_1(t) + D_i^2(t)\tilde{g}_2(t) + c_i(t)$$

where $\tilde{g}_1(t)$=World Equity return $\tilde{g}_2(t)$=Gloom & Doom return $c_i(t)$=return to country i active to the World return and the Gloom and Doom return Note that $\Sigma_i c_i(t)=0$ by construction. The second model is $$f_j^i(t) - \beta_j^i(t)m_i(t) = \sum_k D_{ijk}^3(t)\tilde{g}_{3k}(t) + \sum_j D_{ijl}^4(t)\tilde{g}_{4l}(t) + \phi_{ij}(t)$$

where $\tilde{g}_{3k}(t)$=is the return to the $k^{th}$ global industry $\tilde{g}_{4l}(t)$=is the return to the $l^{th}$ global risk index $\phi_{ij}(t)$=is the purely local part of the return $f_j^i(t)$ Substituting the first model into the second and rearranging terms we get $$f_j^i(t) = \sum_{k=1}^{46} Y_{jk}^i(t) g_k(t) + \phi_j^i(t)$$

by setting $Y_{j1}^i(t) = \beta_j^i(t)$ the World exposure $Y_{j2}^i(t) = \beta_j^i(t) D_i^2(t)$ the Gloom & Doom exposure while for k=3, 4, ... 24, $Y_{jk}^i(t) = \beta_j^{k-2}(t)$ the country exposure and for k=25, 26, ... 43, $$Y_{jk}^i(t) = \begin{cases} 1 & j \text{ is an industry belonging to the } (K-24)^{th} \text{ global industry} \\ 0 & \text{Otherwise} \end{cases}$$

and finally, for k=44 ... 46, $Y_{jk}^i(t) =$ $$\begin{cases} 1 & j \text{ is a risk index belonging to the } (k-43)^{rd} \text{ global risk index} \\ 0 & \text{Otherwise} \end{cases}$$

These equations define the global factor loadings.
In this notation the restriction is $$\sum_{k=3}^{24} g_k(t) = 0$$

In other words, we force the country factor returns to be active to the combination of the World return and Gloom & Doom. With this constraint imposed, the model is now fully identified and may be estimated by a cross-sectional regression for each time period t.

Construction of the Equity Covariance Matrix

Our next task is to generate a covariance matrix G of global factor returns. Here, we face the difficulty that our local models begin at different dates. Consequently, the country factor returns which we are able to estimate have different starting dates. It is desirable that all the time series entering the covariance matrix estimation have the same length. Accordingly, we need to extend some of the country factor return series backwards in time. Our solution is to proxy the missing country factor return data with data derived from a local market return index. Once all the time-series have been completed to the same length we form the exponentially weighted expanding window sample covariance matrix. In other words, the matrix estimated at time t uses all information from periods prior to t with data n periods in the past being weighted by $\alpha^n$ for $\alpha$ a suitable constant. We pick $\alpha$ to have a 90 month half-life, i.e. $\alpha=0.5$. The exponentially weighted estimate has approximately the same statistical weight as an equal weighted moving window estimate with window width $1/(1-\alpha)$. For $\alpha^{90}=0.5$ the equivalent equal weighted window has a width of 130 months. We prefer an exponentially weighted expanding window to an equal weighted moving window because it permits outlier observations to fade away gradually, whereas the moving window method causes outliers to generate artificial shocks as the far edge of the window frame moves past them.

The Currency-Equity Covariance Structure

We now turn to the currency part of the global equity model. There are two sets of covariances. We must estimate currency-to-currency covariances and currency-to-equity covariances. The currency-to-currency part is immediately disposed of by our currency model. Hence, it is enough to consider covariances between currency returns and local equity factor returns. In modeling the relationship between equity factors and currencies, our first observation is that the dimensionalities are such that a simple historical covariance matrix contains many spurious correlation. Accordingly, a more structured approach is required.

We identified four factors which could link equity and currency returns. The first factor is an indicator variable for Russian distress. It is defined as $$c_1(t) = \begin{cases} 1 & \text{if } r(t) < 2\sigma(t) \\ 0 & \text{otherwise} \end{cases}$$

where r(t) is the ruble-dollar exchange rate return and $\sigma(t)$ is an exponentially weighted estimator of the standard deviation of that return. The other three factors, $c_2(t)$, $c_3(t)$ and $c_4(t)$ are defined for each country as the exchange return between local currency and dollar, Euro, and pound, respectively.

For each equity factor f(t) we selected the best single factor model of the form $$f(t) = \alpha + \beta c_i(t) + \epsilon(t)$$

for i ranging from one to four. Here, f was taken to range over both size and market factors. However, no size factor led to a meaningful result and only results for the market factor are tabulated. The results are shown in Table 2. We also considered the best two factor model, however, no two factor model was meaningfully superior to the one factor mode. In considering two factor models we had to disallow the combination of $c_3$ and $c_4$ due to multicolinearity. The cases which result in non-negligible $R^2$ with reasonably significant T-statistics on beta in general seem economically intuitive. They are listed in Table 3.

Using these relationships between equity and currency returns, we may now derive a consistent covariance structure connecting any equity factor and currency exchange rate.

TABLE 2

Market-Currency Models

| country | model factors | intercept | $\beta_1$ | $\beta_2$ | $t_{inter}$ | $t_1$ | $t_2$ | $R^2$ | Adj. $R^2$ |
|---|---|---|---|---|---|---|---|---|---|
| Australia | c3 | 0.008 | −0.14 | . | 1.462 | −0.99 | . | 0.019 | −0 |
| Brazil | c3 | 0.005 | −0.49 | . | 0.405 | −3.02 | . | 0.152 | 0.135 |
| Canada | c1 | 0.015 | 0.045 | . | 2.141 | 1.931 | . | 0.076 | 0.056 |
| France | c4 | 0.014 | 0.632 | . | 2.399 | 2.518 | . | 0.111 | 0.093 |
| France | c1/c4 | 0.019 | 0.036 | 0.532 | 2.47 | 1.315 | 1.728 | 0.133 | 0.089 |

TABLE 2-continued

Market-Currency Models

| country | model factors | intercept | $\beta_1$ | $\beta_2$ | $t_{inter}$ | $t_1$ | $t_2$ | $R^2$ | Adj. $R^2$ |
|---|---|---|---|---|---|---|---|---|---|
| Germany | c4 | 0.012 | 0.641 | . | 1.607 | 1.958 | . | 0.07 | 0.052 |
| Germany | c1/c4 | 0.016 | 0.045 | 0.543 | 1.613 | 1.28 | 1.376 | 0.104 | 0.058 |
| Greece | c4 | 0.024 | 0.185 | . | 1.802 | 0.383 | . | 0.003 | −0.01 |
| Hong Kong | c3 | −0 | −0.39 | . | −0.04 | −0.73 | . | 0.01 | −0.01 |
| Indonesia | c3 | 0.006 | −0.61 | . | 0.351 | −1.1 | . | 0.023 | 0.004 |
| Japan | c4 | 0.001 | 0.168 | . | 0.187 | 1.043 | . | 0.018 | 0.001 |
| Korea | c1 | −0.01 | −0.08 | . | −0.3 | −1.51 | . | 0.049 | 0.027 |
| Malaysia | c1 | 0.002 | 0.079 | . | 0.116 | 1.408 | . | 0.043 | 0.021 |
| Malaysia | c1/c3 | 0.007 | 0.113 | −0.29 | 0.297 | 1.617 | −0.91 | 0.065 | 0.015 |
| Mexico | c3 | 0.004 | −0.58 | . | 0.403 | −2.8 | . | 0.138 | 0.121 |
| Mexico | c2/c3 | −0 | 1.221 | −1.36 | −0.12 | 2.278 | −3.43 | 0.222 | 0.19 |
| Netherlands | c4 | 0.015 | 1.022 | . | 2.247 | 3.665 | . | 0.208 | 0.193 |
| Netherlands | c1/c4 | 0.015 | 0.024 | 1.075 | 1.754 | 0.763 | 3.073 | 0.23 | 0.19 |
| New Zealand | c2 | 0.002 | 0.379 | . | 0.308 | 1.53 | . | 0.039 | 0.022 |
| New Zealand | c3/c4 | −0 | −0.67 | 0.776 | −0.3 | −2.35 | 2.645 | 0.129 | 0.095 |
| South Africa | c1 | 63E-5 | 0.064 | . | 0.063 | 1.854 | . | 0.071 | 0.05 |
| South Africa | c2/c3 | −0.01 | 1.035 | −0.76 | −0.76 | 2.483 | −2.22 | 0.117 | 0.081 |
| Singapore | c4 | 8E-4 | 0.364 | . | 0.075 | 0.85 | . | 0.012 | −0 |
| Sweden | c4 | 0.02 | 0.553 | . | 3.066 | 2.135 | . | 0.073 | 0.057 |
| Switzerland | c4 | 0.013 | 0.567 | . | 2.218 | 2.667 | . | 0.109 | 0.094 |
| Taiwan | c3 | −0.01 | −0.44 | . | −0.83 | −1.34 | . | 0.034 | 0.015 |
| Thailand | c2 | −0.01 | −0.56 | . | −1.01 | −2.28 | . | 0.082 | 0.067 |
| Thailand | c1/c2 | −0.02 | −0.01 | −0.52 | −0.94 | −0.21 | −1.51 | 0.088 | 0.047 |
| United Kingdom | c3 | 0.005 | −0.48 | . | 1.05 | −2.32 | . | 0.095 | 0.077 |
| United Kingdom | c1/c3 | 0.006 | 0.037 | −0.4 | 0.92 | 1.646 | −1.58 | 0.146 | 0.103 |
| United States | c1 | 0.014 | 0.033 | . | 2.078 | 1.375 | . | 0.04 | 0.019 |
| United States | c1/c3 | 0.015 | 0.029 | −0.34 | 1.965 | 1.171 | −1.13 | 0.086 | 0.039 |

TABLE 3

Significant Market-Currency Models

| Currency | Country | $R^2_{adj}$ | \|T − stat on β\| |
|---|---|---|---|
| Dollar | New Zealand | 2.2 | 1.5 |
| Dollar | Thailand | 6.7 | 2.3 |
| Euro | Brazil | 13.5 | 3.0 |
| Euro | Mexico | 12.1 | 2.8 |
| Euro | United Kingdom | 7.7 | 2.3 |
| Pound | France | 9.3 | 2.5 |
| Pound | Germany | 5.2 | 2.0 |
| Pound | Netherlands | 19.3 | 3.7 |
| Pound | Sweden | 5.7 | 2.1 |
| Pound | Switzerland | 9.4 | 2.7 |
| Ruble | Canada | 5.6 | 1.9 |
| Ruble | Malaysia | 2.1 | 1.9 |
| Ruble | South Africa | 5.0 | 1.9 |

Let $$f(t)=\alpha+\beta c(t)+\epsilon(t)$$

be the fitted model for some market. If $\tilde{f}(t)$ is a second equity factor in that market and $\tilde{c}(t)$ is a second currency factor we assume that the covariance between $\tilde{f}(t)$ and $\tilde{c}(t)$ derives from the linkage through $f(t)$ and $c(t)$. Then $$\tilde{f}(t)=\alpha_1+\beta_1 f(t)+\epsilon_1(t)$$

$$\tilde{c}(t)=\alpha_2+\beta_2 c(t)+\epsilon_2(t)$$

and thus $$cov(\tilde{f},\tilde{c})=\beta_1\beta_2 cov(f,c)$$

$$=\beta_1\beta_2\beta var(c)$$

Here, only the quantity β is actually estimated. The quantities $\beta_1$, $\beta_2$ and var(c) are calculated from the equity and currency covariance matrices respectively. In this way, we may compute the covariance block between the currencies and local equity markets.

The Total Covariance Structure

Let i=0 indicate currencies and for i>0 let i denote the $i^{th}$ local equity market. We have described the construction of the covariance block $C^{i,j}$ giving the covariances between the factors of the $i^{th}$ and $j^{th}$ markets. We assemble these blocks into a large covariance matrix $\tilde{F}$ where $$\tilde{F}=\begin{pmatrix} C^{0,0} & C^{0,1} & C^{0,2} & \cdots & C^{0,n} \\ C^{1,0r} & C^{1,1} & C^{1,2} & \cdots & C^{1,n} \\ \vdots & \vdots & \vdots & & \vdots \end{pmatrix}$$

This is our preliminary estimate of the common factor covariance matrix. We rescale it as described above to bring the diagonal blocks to their target values, thus achieving our final estimate of common factor covariance matrix $\hat{F}$. This completes our construction of the New Global Equity Model.

Properties and Applications of the Model

Having formulated the Global Equity Model, it is of interest to probe the model's properties and to apply this new tool to some questions in global equity analysis.

Properties of the Global Model

We first consider the fit of the model. FIG. 1 shows the monthly $R^2$ of the model, together with a six month moving average. While model fit varies from month to month, average fit is stable. Summary statistics on fit are given in Table 4. There is no statistically significant variation in the level of fit between in-sample and out-of-sample periods. Note that the average level of fit is 68%, as compared with a typical value of 30% for single country equity factor models. The higher fit in the global model can be understood as the model is fit at the factor return level rather than at the asset level.

TABLE 4

Properties of Model Fit ($R^2$)
(April 1978–December 1999)

| Mean | 0.68 | minimum | 0.28 |
|---|---|---|---|
| median | 0.68 | 25% tile | 0.57 |
| standard deviation | 0.14 | 75% tile | 0.77 |
| interquartile range | 0.20 | maximum | 0.94 |

Model Fit for Various Subperiods

| Period | mean $R^2$ (%) |
|---|---|
| April 1978–December 1992 | 67 |
| January 1993–December 1998 | 68 |
| January 1994–December 1999 | 63 |

Figure 2:
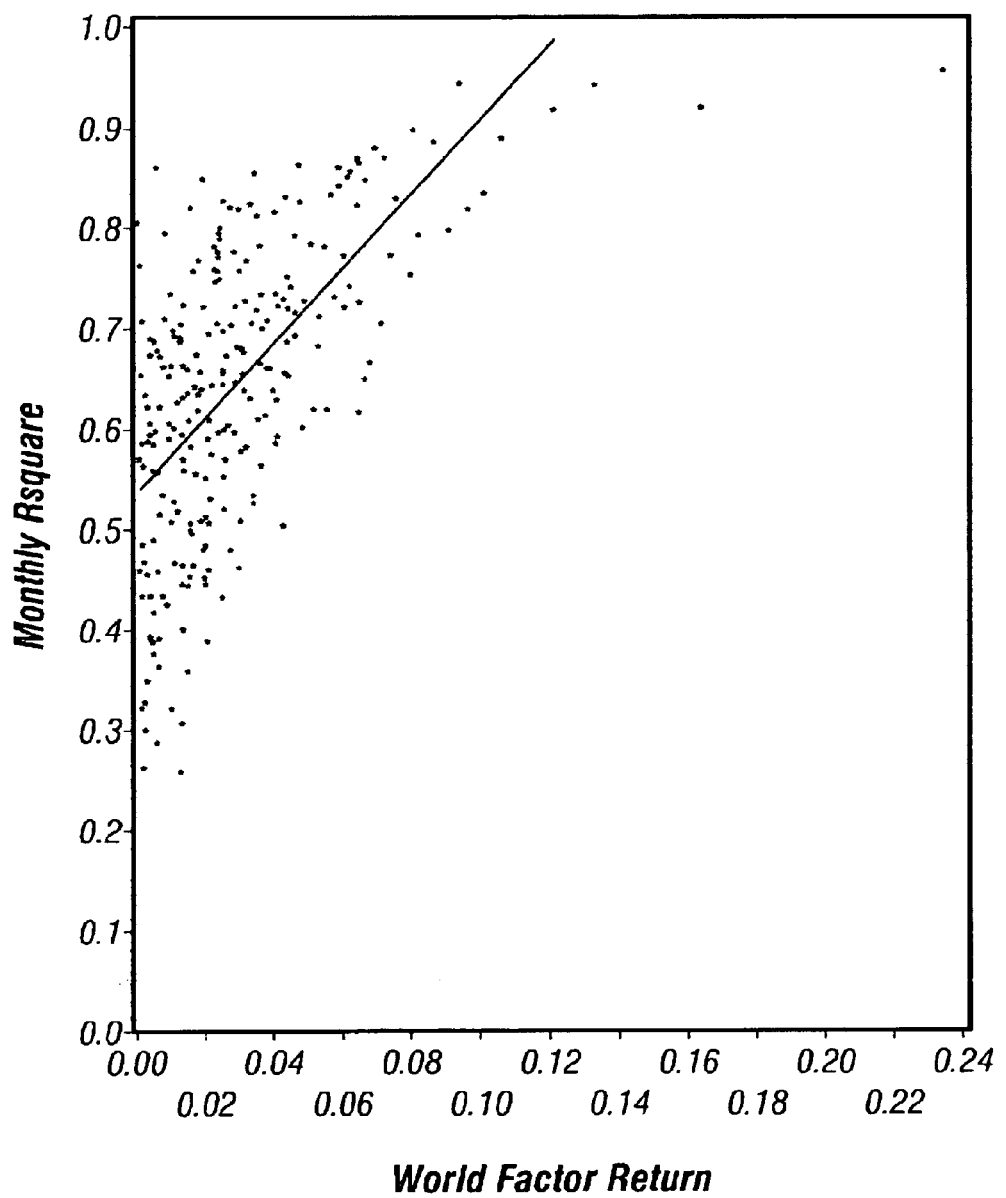
FIG. 2 is a graph which shows a regression model $R^2$ versus absolute world return.

FIG. 2 plots monthly fit against the absolute return to the world factor. Just as the fit of local models improves in months when there is a strong local market effect, so the fit of the global model improves in months when there is a strong world market effect. In fact, the regression $$R^2(t) = \alpha + \beta |w(t)| + \epsilon(t)$$

on the absolute world return w(t) has the properties shown in Table 5. In particular, the magnitude of the world return explains 37% of the variation in the fit of the global model.

TABLE 5

Relationship of Model Fit to Absolute World Return
(estimated over April 1978 to December 1999)

| | parameter | standard error | t-stat | prob t |
|---|---|---|---|---|
| α | 0.53 | 0.011 | 48.8 | 0.0001 |
| β | 3.76 | 0.30 | 12.4 | 0.0001 |

In Table 6 we show for each global factor some summary statistics on its t-statistic. Excepting the risk indices, every factor is clearly significant judged by the absolute value of the t-statistic being greater than two more often than can be explained by chance. Of the three risk indices, Momentum is marginally significant by this test, whereas Size and Volatility are not. The low level of significance for the risk indices provides some validation for our choice of cut-off in the factor selection process. Shortly, we shall present evidence that Size and Volatility are highly correlated with the World factor. This finding suggests that at the global level these factors have been cannibalized by the World factor. The interesting implication is that at the local level these factors may be picking up a projection of the World factor into the national market. Certainly for Size this would be a credible interpretation. This thought provides an interesting side light on the work of Chaumeton and Coldiron on the one hand and Chandrashekaran, Hui, and Rudd on the other. These investigators searched for a global company factor, but were stymied by the sought for factor apparently being confounded with the size factor. Perhaps the global company factor and the size factor should be seen as imperfect descriptions of the same concept, rather than as confounded factors.

TABLE 6

Absolute Values of Factor t-statistics
(January 1993 to December 1998)

| Factor | % time \|t-stat\| > 2 | 90th Percentile | 95th Percentile |
|---|---|---|---|
| World | 85.1 | 20.0 | 24.1 |
| Australia | 67.6 | 9.2 | 12.5 |
| Brazil | 69.2 | 10.1 | 12.7 |
| Canada | 78.1 | 9.9 | 12.0 |
| France | 55.5 | 5.9 | 7.0 |
| Germany | 60.8 | 8.6 | 10.6 |
| Greece | 62.9 | 9.0 | 12.7 |
| Hong Kong | 72.2 | 10.4 | 13.7 |
| Indonesia | 77.1 | 11.0 | 16.6 |
| Japan | 83.5 | 15.3 | 18.8 |
| Korea | 86.2 | 17.7 | 21.7 |
| Malaysia | 70.0 | 13.5 | 16.5 |
| Mexico | 81.9 | 9.0 | 10.0 |
| Netherlands | 50.6 | 5.3 | 6.4 |
| New Zealand | 45.7 | 5.2 | 6.3 |
| Singapore | 68.5 | 9.6 | 10.8 |
| South Africa | 84.5 | 14.0 | 15.7 |
| Sweden | 71.2 | 10.0 | 11.9 |
| Switzerland | 57.0 | 6.0 | 7.2 |
| Taiwan | 88.0 | 22.1 | 31.9 |
| Thailand | 81.5 | 14.7 | 17.1 |
| United Kingdom | 74.1 | 10.1 | 13.7 |
| United States | 75.9 | 11.3 | 13.2 |
| Airlines | 21.5 | 2.9 | 3.2 |
| Autos | 8.4 | 1.9 | 2.3 |
| Banks | 20.7 | 2.8 | 3.3 |
| Beverage & Tobacco | 17.6 | 2.5 | 2.7 |
| Electronics | 16.9 | 2.3 | 2.9 |
| Energy | 52.9 | 4.9 | 5.9 |
| Financial Services | 19.9 | 2.4 | 3.1 |
| Food | 9.6 | 1.9 | 2.4 |
| Health | 18.8 | 2.4 | 2.9 |
| Information Technology | 18.8 | 2.9 | 3.4 |
| Insurance | 26.4 | 2.9 | 3.3 |
| Media | 16.1 | 2.2 | 2.6 |
| Mining | 20.3 | 2.6 | 3.3 |
| Precious Metals | 63.2 | 7.1 | 9.6 |
| Property | 16.1 | 2.3 | 3.0 |
| Raw Materials | 10.3 | 2.0 | 2.3 |
| Technology | 18.0 | 2.7 | 3.2 |
| Telephones | 18.4 | 2.5 | 3.0 |
| Utilities | 18.4 | 2.6 | 3.3 |
| Momentum | 5.4 | 1.7 | 2.0 |
| Size | 2.7 | 1.5 | 1.8 |
| Volatility | 0.7 | 1.1 | 1.4 |
| Gloom & Doom | 9.5 | 1.9 | 2.5 |

Figure 3:
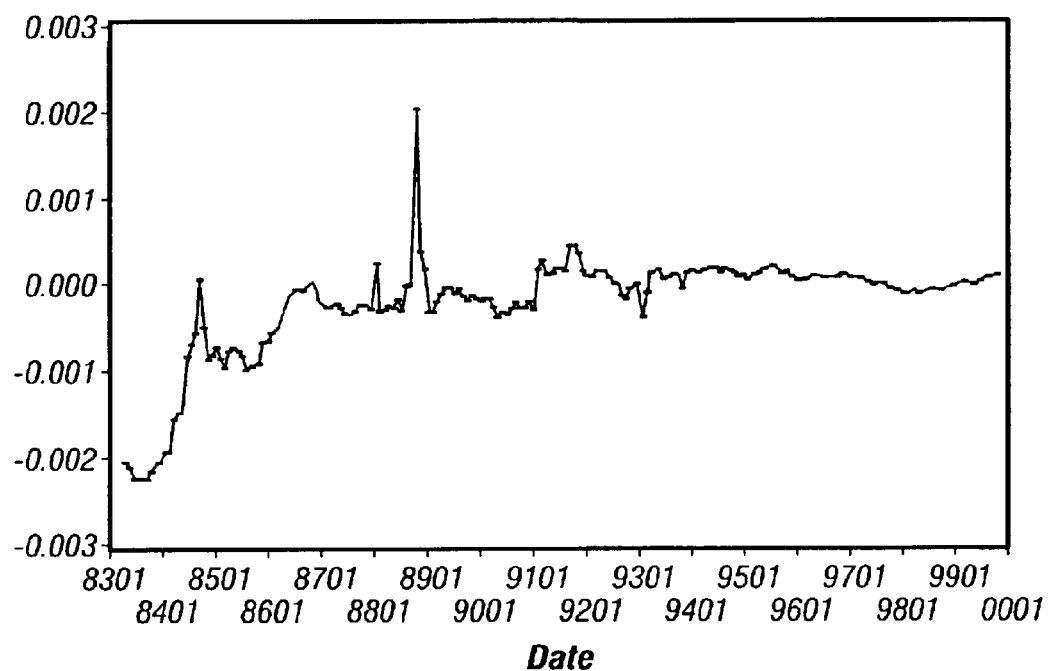
FIG. 3 is a graph which shows cross-country correlation of purely local returns.
Figure 3:
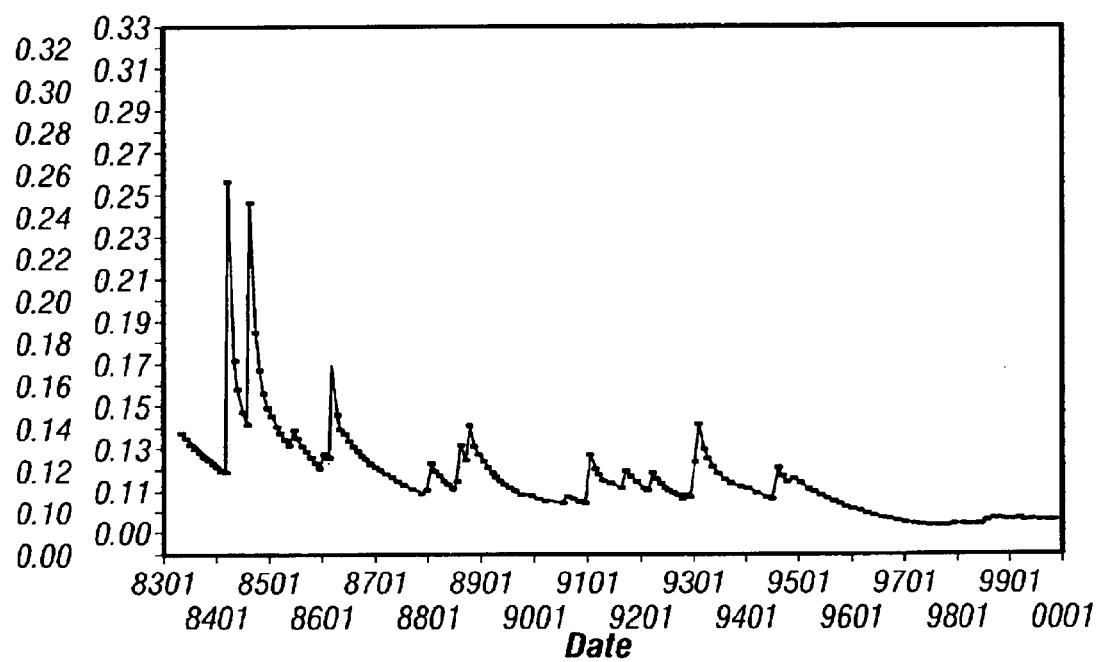

A key assumption of our model is that the global factor structure Y accounts for all significant covariances between local models. An implication is that the sample covariance matrix $$\Phi_{ij}(t) = cov(\{\phi_i(u), \phi_j(u)\}_{u=1}^t)$$

should be block diagonal. We test this hypothesis by computing the mean of the cells of the off-diagonal blocks in Φ and also the mean magnitude of these off diagonal cells. FIG. 3 shows these quantities calculated from a 60 month moving window. In the early period some spikes are evident. These spikes are data artifacts occasioned by the entrance of new models into the analysis and hence the calculation of correlation of very short time series, leading to spuriously high values. Note that the imposition of a block diagonal structure on Φ filters these artifacts out of the final model. Looking at the more recent history we see that the level of correlation is low and very stable. The mean value is −0.0003 and the mean magnitude is 0.11. These values are consistent with the hypothesis that the purely local factor returns are uncorrelated across countries. The stability of these values argues against a recent change in the global factor structure.

To summarize the discussion to this point, the global model fits well, appears free of degenerate behavior, and conforms to the posited model structure.

Properties of the Global Factors

We turn from a consideration of the model as a whole to a consideration of the properties of its factors. Table 7 summarizes the important time-series properties of the model's factors. The typical factor appears to be an independent identically distributed normal variable with mean close to 0 and standard deviation of about 3% per month. Some notable exceptions to this pattern occur however:

1) The World exhibits excess kurtosis and has a mean return of 0.5% per month.
2) The emerging market countries have standard deviations in the range of 6–12%. Several of them exhibit either more kurtosis or more conditional heteroscedasticity than is consistent with homoscedastic normality.
3) Mining and Precious Metals exhibit more skewness and kurtosis than is consistent with normality. However, they do appear homoscedastic. Information Technology and Technology show both high mean returns and high information ratio. Health and Media also exhibit high information ratios on somewhat lower returns. Energy, Telephones, and Utilities may exhibit some serial correlation in returns.
4) Momentum is non-normal and shows some serial correlation.
5) Gloom & Doom shows striking levels of skewness, kurtosis, serial correlation, and heteroscedasticity.

TABLE 7

Time Series Properties of Factor Returns
(January 1990–January 2000)

Figure 4:
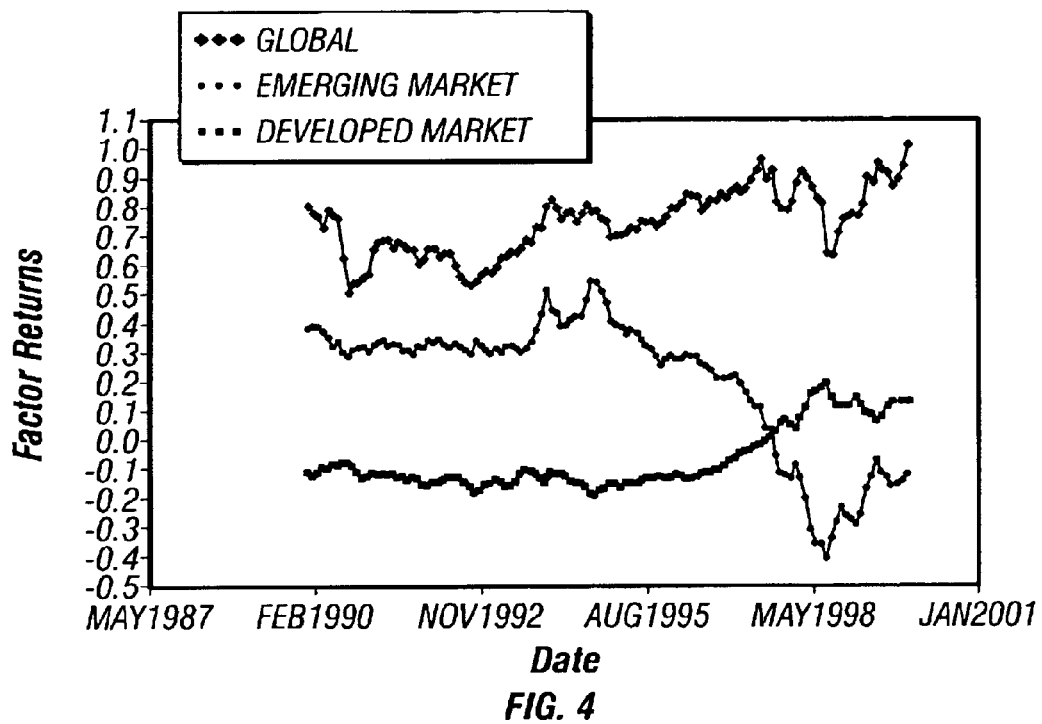
FIG. 4 is a graph which shows world return history.

| Factor | MEAN | STD | SKEWNESS | KURTOSIS | PROBN | RATIO | SER CORR (%) | SER2 CORR (%) |
|---|---|---|---|---|---|---|---|---|
| World | 0.52 | 3.97 | −1.42 | 6.11 | 0.00 | 13 | 16 | 4 |
| Australia | −0.21 | 4.42 | 0.10 | 1.66 | 53.41 | −5 | −9 | 9 |
| Brazil | 0.19 | 9.67 | 1.31 | 4.01 | 0.10 | 2 | 27 | 11 |
| Canada | −0.37 | 2.80 | 0.09 | −0.07 | 51.50 | −13 | 3 | −5 |
| France | 0.45 | 3.58 | 0.36 | 1.06 | 75.51 | 13 | 18 | 22 |
| Germany | 0.20 | 4.67 | −0.57 | 2.02 | 5.26 | 4 | 8 | 26 |
| Greece | 0.26 | 8.61 | 1.06 | 2.54 | 0.01 | 3 | 17 | 16 |
| Hong Kong | 0.43 | 6.89 | −0.10 | 3.57 | 0.01 | 6 | 5 | 35 |
| Indonesia | −0.06 | 9.50 | 0.39 | 2.16 | 7.66 | −1 | 4 | 6 |
| Japan | −0.24 | 4.52 | 0.15 | 1.11 | 66.30 | −5 | 0 | 16 |
| Korea | −0.30 | 9.38 | 1.32 | 5.79 | 0.00 | −3 | −7 | −1 |
| Malaysia | −0.11 | 8.98 | 0.79 | 1.95 | 0.06 | −1 | −7 | 15 |
| Mexico | −0.27 | 5.87 | −0.76 | 1.89 | 8.00 | −5 | 2 | 13 |
| Netherlands | 0.34 | 3.08 | −0.71 | 1.96 | 6.10 | 11 | 7 | 7 |
| NewZealand | −0.28 | 4.11 | 0.83 | 2.39 | 7.24 | −7 | 3 | −6 |
| Singapore | −0.06 | 5.10 | 0.14 | 2.57 | 24.61 | −1 | 12 | 16 |
| South Africa | −0.15 | 4.21 | −0.42 | 0.42 | 57.48 | −4 | 4 | 1 |
| Sweden | 0.28 | 4.84 | 0.27 | 3.58 | 72.03 | 6 | 1 | −2 |
| Switzerland | 0.22 | 3.14 | −0.19 | 0.79 | 94.04 | 7 | 11 | 8 |
| Taiwan | 0.27 | 11.06 | 0.45 | 2.41 | 0.19 | 2 | 9 | 41 |
| Thailand | −0.73 | 7.97 | 0.37 | 0.78 | 66.95 | −9 | 15 | 6 |
| United Kingdom | −0.03 | 3.08 | 0.30 | 1.30 | 90.35 | −1 | −3 | −6 |
| United States | 0.19 | 2.36 | 0.38 | 0.85 | 35.88 | 8 | −4 | 4 |
| Airlines | 0.20 | 3.65 | 0.25 | 0.04 | 24.34 | 6 | 4 | −7 |
| Autos | −0.18 | 1.59 | 0.18 | 0.99 | 65.22 | −11 | 5 | 1 |
| Banks | 0.15 | 1.82 | 0.57 | 1.66 | 0.82 | 8 | 16 | 20 |
| Beverage & Tobacco | 0.17 | 1.54 | −0.07 | 0.07 | 95.77 | 11 | 21 | 13 |
| Electronics | 0.30 | 1.69 | 0.51 | 1.16 | 7.30 | 18 | 12 | 31 |
| Energy | 0.13 | 3.68 | 0.40 | 1.08 | 27.56 | 4 | 34 | 22 |
| Financial Services | 0.19 | 1.34 | 0.33 | 1.18 | 4.97 | 14 | 16 | 16 |
| Food | −0.11 | 1.22 | 0.02 | 1.04 | 72.63 | −9 | 21 | 8 |
| Health | 0.34 | 1.53 | 0.03 | 1.16 | 87.78 | 22 | 15 | 30 |
| Information Technology | 0.75 | 2.97 | 0.65 | 1.34 | 0.09 | 25 | 19 | 27 |
| Insurance | 0.09 | 1.83 | 0.00 | 0.84 | 99.45 | 5 | 17 | 12 |
| Media | 0.44 | 1.43 | 0.09 | 1.55 | 64.92 | 31 | 16 | 6 |
| Mining | −0.07 | 1.78 | 1.11 | 3.85 | 0.00 | −4 | 8 | 4 |
| Precious Metals | 0.50 | 8.93 | 1.18 | 3.98 | 0.00 | 6 | 6 | −1 |
| Property | −0.20 | 1.10 | 0.28 | 1.50 | 95.85 | −18 | 12 | 4 |
| Raw Materials | −0.09 | 1.11 | 0.54 | 0.86 | 8.73 | −9 | 6 | 23 |
| Technology | 0.93 | 3.00 | 0.88 | 3.70 | 3.76 | 31 | 14 | 22 |
| Telephones | 0.25 | 2.04 | 0.51 | 0.96 | 7.13 | 12 | 24 | 20 |
| Utilities | −0.09 | 1.96 | 0.47 | 1.54 | 1.17 | −4 | 26 | 6 |
| Momentum | 0.06 | 0.69 | −0.82 | 3.30 | 0.00 | 9 | 30 | 13 |
| Size | −0.04 | 0.58 | 0.11 | 0.37 | 96.45 | −7 | −2 | 13 |
| Volatility | 0.01 | 0.77 | 0.19 | 1.41 | 0.32 | 1 | −8 | 13 |
| Gloom & Doom | −0.02 | 0.66 | −5.43 | 50.57 | 0.00 | −3 | 37 | 48 | std = standard deviation
probn = probability factor returns are normally distributed
ratio = mean/std
ser corr = serial correlation of factor returns
ser2 corr = serial correlation of squared factor returns Here we call attention to several of the more interesting comparisons. FIG. 4 shows the cumulative factor returns for the World and the mean country returns for developed and emerging markets. Since 1992, emerging and developed markets have trended in somewhat opposite directions, thus muting the trend in the World.

Figure 5:
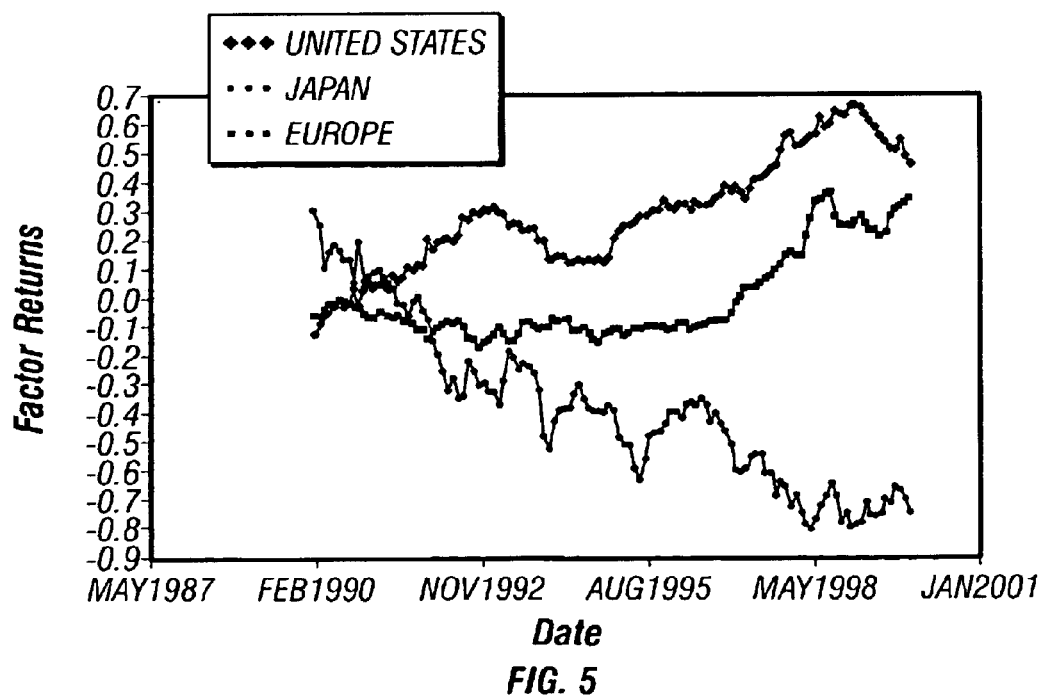
FIG. 5 is a graph which shows developed world return history.

FIG. 5 breaks the developed region down into the U.S., Japan and Europe. Until recently, the basic pattern has been for Europe and the U.S. to trend upwards and Japan downwards. The latest data may not conform to this pattern, however.

Figure 6:
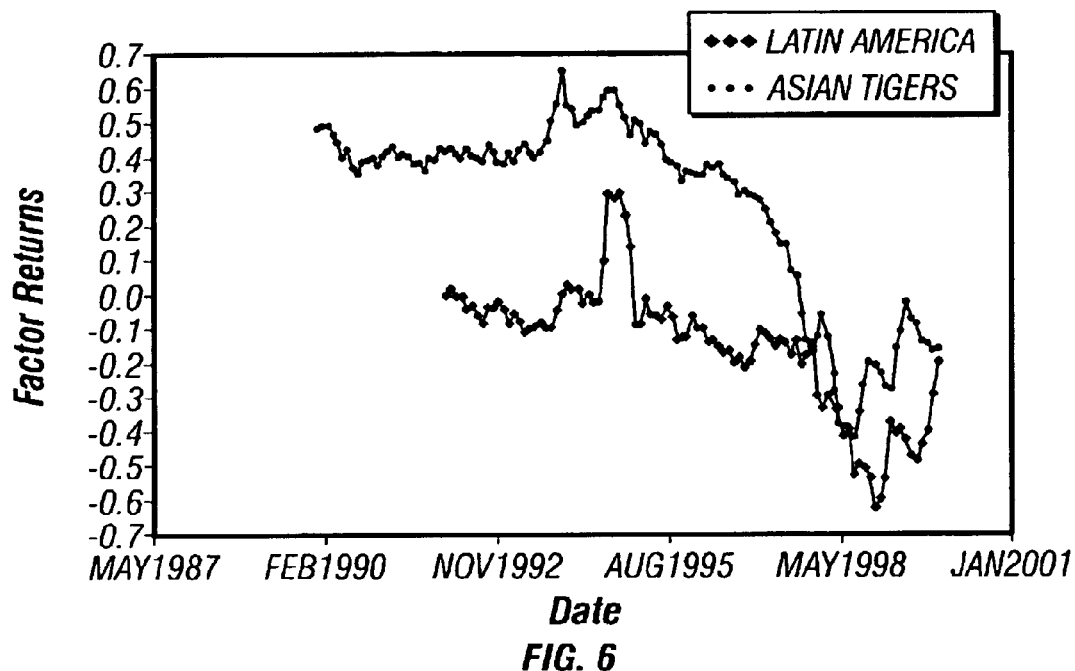
FIG. 6 is a graph which shows emerging world return history.

FIG. 6 compares the Asian and Latin American emerging markets. In both regions we see a pattern of stability, brief upward tick, decline, collapse, and recovery. However, the amplitudes and turning points associated with each subperiod seem distinct.

Figure 7:
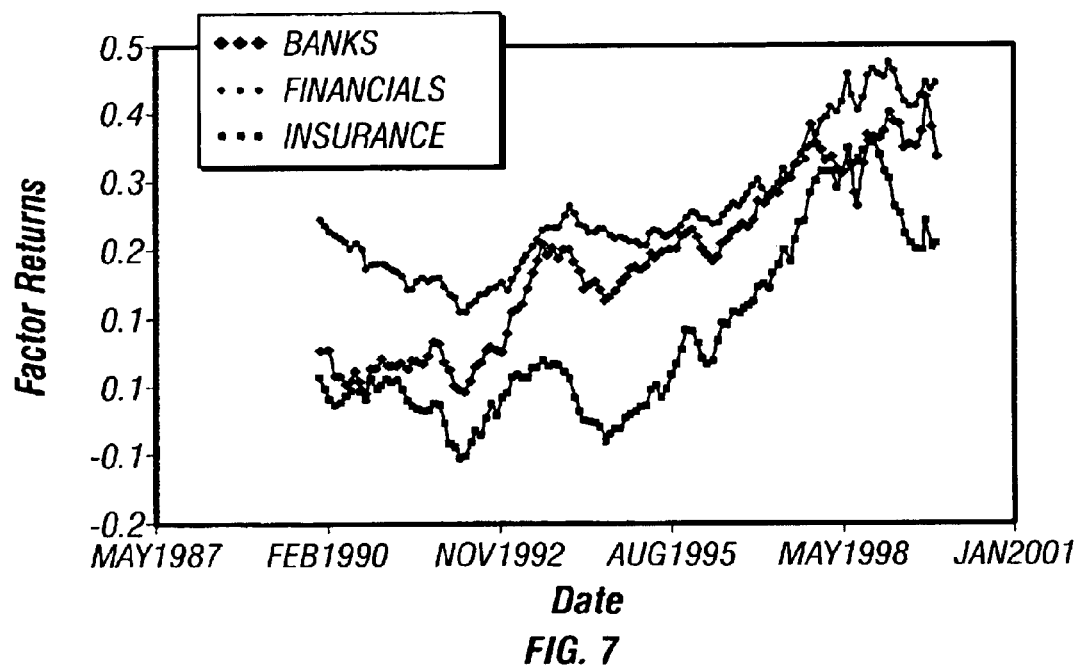
FIG. 7 is a graph which shows financial industries return history.

FIG. 7 shows three financial industries. While interest rate and credit cycles broadly affect all three, insurance is in addition exposed to the underwriting cycle, and we note a recent divergence between insurance and the other two.

Figure 8:
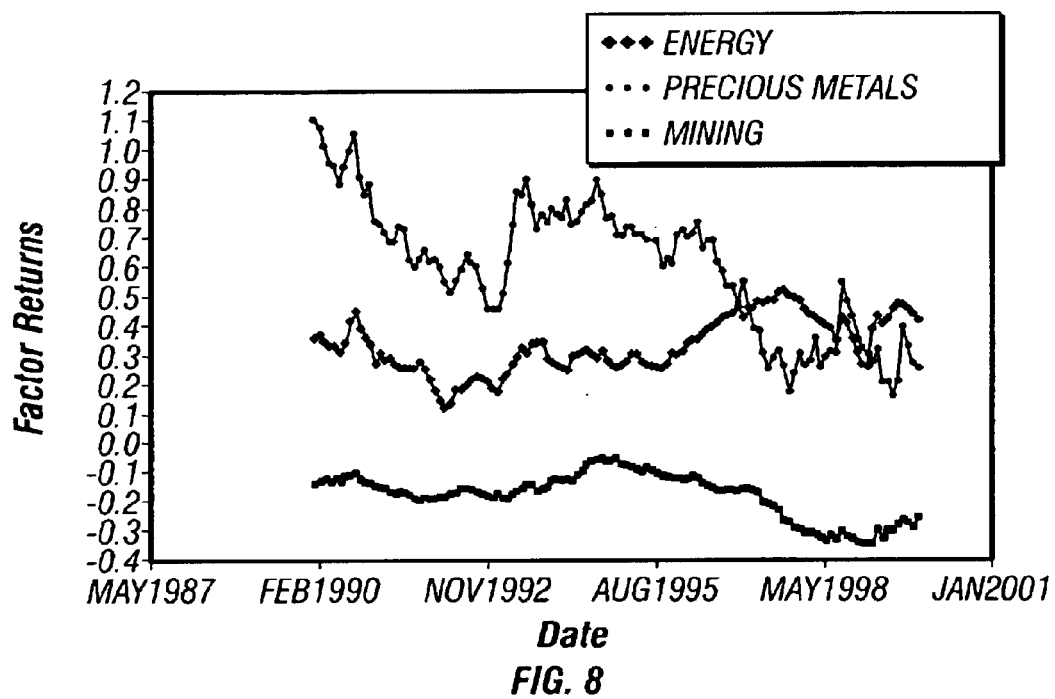
FIG. 8 is a graph which shows extractive industries return history.

Three extractive industries are shown in FIG. 8. Here, we see Precious Metals to be in a prolonged bear market. By contrast, Energy is trending gradually upwards and Mining is trending gradually downwards with a cyclical modulation.

Figure 9:
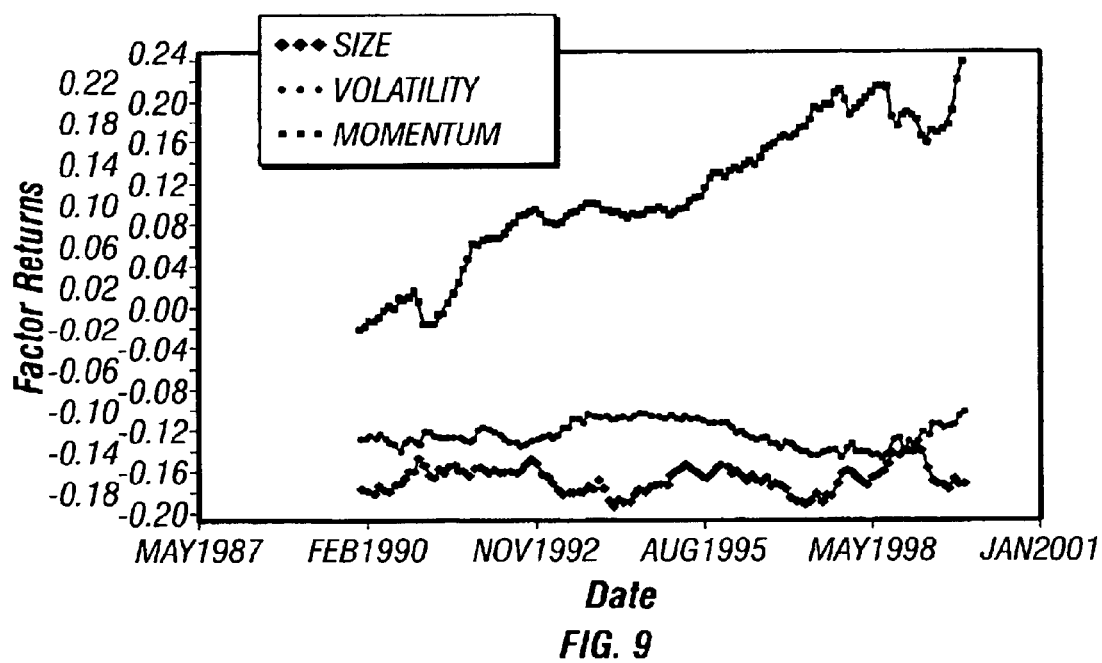
FIG. 9 is a graph which shows risk index return histories.

The three risk indices are shown in FIG. 9. The trend in Momentum makes a strong contrast with the aimless behavior of the other two.

Figure 10:
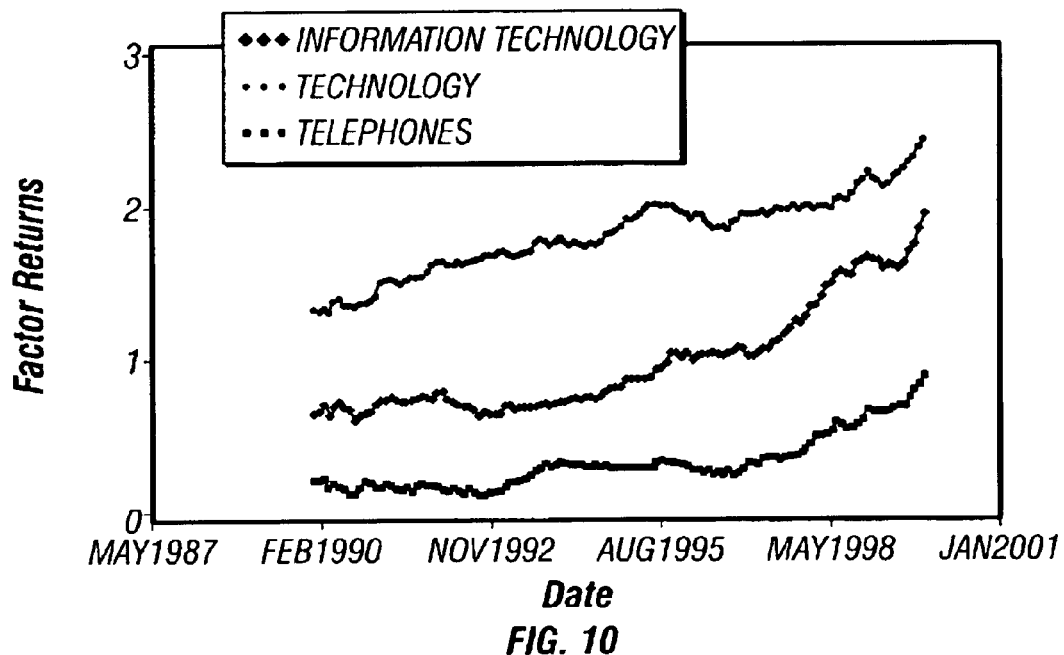
FIG. 10 is a graph which shows technology industry return histories.

By contrast, the technology industries shown in FIG. 10 have enjoyed a significant advance. The emergence of a strong trend in Telephones is more recent than in the other two.

Figure 11:
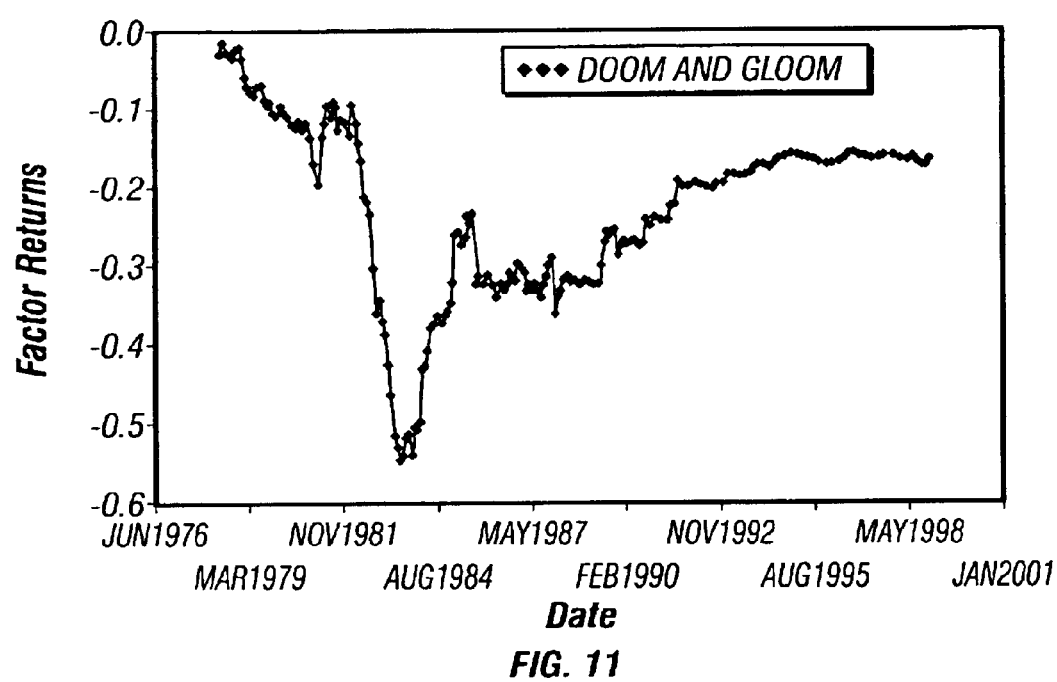
FIG. 11 is a graph which shows doom & gloom return history.

Finally, FIG. 11 shows the Gloom & Doom factor. Here, the importance of point events to the factor return is notable.

Thus, visual inspection confirms the impression formed from Table 7 that each factor return has its distinctive characteristics.

The average correlation between different groups of factors are given in Table 8. Except for the World-Risk Index correlation, most cross-group correlation are on average small. Note that industries and countries are more correlated within themselves than with other groups. Additional insight into the factor covariance structure can be gleaned from Table 9, which shows for each factor its volatility and most important correlation. In general, the correlation are quite intuitive. For countries regional groupings emerge (Table 10), but the correlation remain sufficiently low that we do not find a need to replace country concepts with regional concepts. Looking at subperiods, increasing integration within the European region is particularly notable. Similarly industries tend to correlate within sector groupings, but again the correlation are not so strong as to suggest replacing industry concepts with sector concepts.

TABLE 8

Mean Correlations Between Classes of Factors (excluding self correlations, in percent, for January 1999)

| | World | Countries | Industries | Risk Indices |
|---|---|---|---|---|
| countries | 4.6 | −3.6 | −0.1 | 1.0 |
| industries | −11 | 0.1 | 13.8 | 4.0 |
| risk indices | 36.4 | 1.0 | 4.0 | 7.1 |
| Gloom & Doom | 1.4 | 1.0 | 0.9 | −5.8 |

TABLE 9

Factor Volatility (%/pa) and Three Factors with Largest Absolute Correlations (%) for each Factor as of January 1999

| | | | | | | | |
|---|---|---|---|---|---|---|---|
| World | 14 | Volatility | 75 | Utilities | −58 | Size | 51 |
| Australia | 15 | New Zealand | 51 | South Africa | −32 | Indonesia | −30 |
| Brazil | 34 | Mexico | 42 | United States | −33 | United Kingdom | −29 |
| Canada | 10 | United States | 43 | Taiwan | −42 | Japan | −30 |
| France | 12 | Greece | 55 | Netherlands | 54 | Switzerland | 38 |
| Germany | 16 | France | 55 | Netherlands | 50 | Switzerland | 46 |
| Greece | 30 | Automobiles | 30 | France | 28 | Switzerland | 24 |
| Hong Kong | 24 | Malaysia | 51 | Singapore | 51 | France | −28 |
| Indonesia | 33 | United Kingdom | −40 | World | 36 | Malaysia | 32 |
| Japan | 16 | United States | −32 | Malaysia | −30 | Canada | −30 |
| Korea | 32 | France | −34 | Australia | −27 | Greece | −26 |
| Malaysia | 31 | Singapore | 51 | Hong Kong | 51 | Thailand | 45 |
| Mexico | 20 | Brazil | 42 | Technology | −26 | World | 19 |
| Netherlands | 11 | France | 54 | Switzerland | 54 | Greece | 50 |
| New Zealand | 14 | Australia | 51 | Sweden | 22 | Taiwan | −22 |
| Singapore | 18 | Malaysia | 51 | Hong Kong | 51 | Volatility | 39 |
| South Africa | 15 | Utilities | −37 | Australia | −32 | Property | −30 |
| Sweden | 17 | France | 32 | Netherlands | 30 | South Africa | −29 |
| Switzerland | 11 | Netherlands | 53 | Greece | 46 | Malaysia | −41 |
| Taiwan | 38 | Canada | −42 | United States | −33 | Netherlands | −32 |
| Thailand | 28 | Malaysia | 45 | Volatility | 33 | World | 32 |
| United Kingdom | 34 | Indonesia | −39 | Brazil | −29 | Taiwan | −27 |
| United States | 8 | Canada | 43 | Japan | −34 | Brazil | −33 |
| Airlines | 13 | Indonesia | −28 | Australia | −19 | Energy | −18 |
| Automobiles | 6 | Greece | 30 | New Zealand | 20 | Mexico | −18 |
| Banks | 6 | Insurance | 51 | Financial Services | 48 | Utilities | 34 |
| Beverage & Tobacco | 5 | Food | 46 | Utilities | 41 | Health | 41 |
| Electronics | 6 | Volatility | 27 | Information Technology | 26 | Indonesia | 24 |

TABLE 9-continued

Factor Volatility (%/pa) and Three Factors with Largest
Absolute Correlations (%) for each Factor as of January 1999

| | | | | | | | |
|---|---|---|---|---|---|---|---|
| Energy | 13 | Precious Metals | 27 | Utilities | 25 | Property | 23 |
| Financial Services | 5 | Insurance | 52 | Banks | 45 | Indonesia | 25 |
| Food | 4 | Utilities | 50 | Beverage & Tobacco | 46 | World | −40 |
| Health | 5 | Beverage & Tobacco | 41 | Food | 37 | Utilities | 34 |
| Information Technology | 10 | Technology | 28 | Telephones | 28 | Electronics | 26 |
| Insurance | 6 | Financial Services | 52 | Banks | 51 | Food | 36 |
| Media | 5 | Telephones | 32 | Taiwan | −19 | South Africa | 19 |
| Mining | 6 | Precious Metals | 39 | Malaysia | 28 | Brazil | 27 |
| Precious Metals | 31 | Mining | 39 | Energy | 27 | France | −28 |
| Property | 4 | South Africa | −31 | Energy | 23 | Japan | 23 |
| Raw Materials | 4 | France | −27 | Mining | 27 | Malaysia | 26 |
| Technology | 10 | Information Technology | 29 | Mexico | −26 | Electronics | 20 |
| Telephones | 7 | Utilities | 42 | Media | 32 | World | −28 |
| Utilities | 7 | World | −58 | Food | 48 | Telephone | 42 |
| Momentum | 2 | Singapore | −33 | Malaysia | −30 | Hong Kong | −24 |
| Size | 2 | World | 51 | Volatility | 44 | Thailand | 31 |
| Volatility | 3 | World | 75 | Size | 44 | Singapore | 39 |
| Gloom & Doom | 2 | Brazil | 21 | Technology | −16 | Energy | −16 |

TABLE 10

Regional Correlations

| | |
|---|---|
| AUSNZ: | Australia, New Zealand |
| Asia ex Japan: | Hong Kong, Malaysia, Singapore, Thailand, Indonesia, Korea, Taiwan |
| Europe: | France, Germany, Netherlands, Sweden, Switzerland, United Kingdom |
| Latin America: | Brazil, Mexico |
| North America: | Canada, United States |

Mean pairwise correlations between groups,
December 1987–December 1999, in percent

| Region | AUSNZ | Asia | Europe | Latin America | North America |
|---|---|---|---|---|---|
| AUSNZ | 49 | −15 | 8 | −11 | 13 |
| Asia | | 41 | −22 | 2 | −17 |
| Europe | | | 32 | −6 | −3 |
| Latin America | | | | 42 | −12 |
| North America | | | | | 50 |

Mean within group pairwise correlation
by subperiod, in percent

| Region | Dec. 1989–Dec. 1994 | Dec. 1994–Dec. 1999 |
|---|---|---|
| AUSNZ | 53 | 44 |
| Asia | 34 | 41 |
| Europe | 19 | 44 |
| Latin America | 63 | 43 |
| North America | 42 | 58 |

Properties of the Purely Local Factors

A new analytical concept introduced with the model is that of the purely local factor return. We may investigate the structures which it reveals in several ways. First, for each country we would like to form a measure of how much of the variability in that market derives from purely local factors. For a covariance matrix M the total variation statistic is tr M (trace of M). It gives a measure of how much variability there is in the covariance structure described by M. The quantity tr $\Phi^i$/tr $F^i$ suggests itself as such a measure of the relative level of purely local variation in market i. As a tool for making comparisons among countries, however, this measure proves not entirely suitable. The difficulty is that $F^i$ contains the variability due to the country market return, while $\rho^i$ does not. As market volatility varies strongly across countries, this effect confounds the attempt to use tr $\Phi^i$/tr $F^i$ as a measure of how important the purely local effects are in country i. Accordingly, we introduce a modified measure. Let $\lambda_1^i$ be the largest eigenvalue of $F^i$. Then $\lambda_1^i$ essentially represents the variability of the market return in country i. We take $$L_i(t)=tr\Phi^i(t)/[trF^i(t)-\lambda_1^i(t)]$$

as our measure of how important the local factors are in country i at time t. Table 11 tabulates these ratios.

TABLE 11

Fraction of Total Variation in each Market due to Purely Local
Factors, as of January 2000

| Country | tr $\Phi^i$ | tr $F^i$ − $\lambda_1^i$ | $L_i$ (t) |
|---|---|---|---|
| Taiwan | 0.0873 | 0.06158 | 1.42 |
| New Zealand | 0.00522 | 0.00393 | 1.33 |
| Brazil | 0.08594 | 0.07745 | 1.11 |
| Malaysia | 0.03439 | 0.03207 | 1.07 |
| Japan | 0.05193 | 0.04874 | 1.07 |
| Mexico | 0.01191 | 0.01125 | 1.06 |
| Australia | 0.03012 | 0.02884 | 1.04 |
| Thailand | 0.20343 | 0.19499 | 1.04 |
| Germany | 0.02353 | 0.02386 | 0.99 |
| Greece | 0.05264 | 0.05467 | 0.96 |
| Indonesia | 0.07956 | 0.08528 | 0.93 |
| Sweden | 0.03028 | 0.03259 | 0.93 |
| Switzerland | 0.00959 | 0.01033 | 0.93 |
| Netherlands | 0.00447 | 0.00487 | 0.92 |
| Singapore | 0.02957 | 0.03271 | 0.90 |
| Korea | 0.09732 | 0.10766 | 0.90 |
| South Africa | 0.11677 | 0.13025 | 0.90 |
| Hong Kong | 0.02468 | 0.02905 | 0.85 |
| France | 0.00881 | 0.01049 | 0.84 |
| United Kingdom | 0.04287 | 0.05151 | 0.83 |
| United States | 0.04955 | 0.07091 | 0.70 |
| Canada | 0.03228 | 0.04796 | 0.67 |

The table clearly shows that barely local factors come as significant source of risk for concentrated portfolios.

We may also study the pattern of purely local returns from a factor viewpoint. For each factor i we may take the ratio var($\Phi_1$)/var($f_i$) as a measure of how local that factor is. Collecting the means of these ratios over factors of a given type, e.g. Technology or Size, we get a measure of how much local variation in behavior there is within the scope of a globally defined concept. Here, the results are presented in Table 12.

TABLE 12

Degree of Local Variation within Global Factors Based on Variance Estimates for January 1999, in percent

| | | | | | |
|---|---|---|---|---|---|
| United Kingdom | 76 | Aerospace | 50 | Momentum | 76 |
| Australia | 61 | Energy | 44 | Size | 75 |
| New Zealand | 61 | Precious Metals | 37 | Volatility | 70 |
| Taiwan | 58 | Technology | 37 | | |
| Greece | 54 | Utilities | 36 | | |
| Germany | 52 | Commercial Services | 32 | | |
| Netherlands | 49 | Computers | 31 | | |
| Switzerland | 49 | Telephones | 31 | | |
| South Africa | 47 | Banking | 29 | | |
| France | 46 | Insurance | 29 | | |
| Brazil | 45 | Property | 29 | | |
| Sweden | 45 | Health | 28 | | |
| Malaysia | 43 | Mining | 28 | | |
| Indonesia | 41 | Beverage & Tobacco | 27 | | |
| United States | 41 | Info. Technology | 27 | | |
| Thailand | 39 | Transportation | 27 | | |
| Canada | 38 | Electronics | 26 | | |
| Singapore | 37 | Airlines | 25 | | |
| Hong Kong | 35 | Media | 25 | | |
| Japan | 35 | Financial Services | 23 | | |
| Mexico | 34 | Services | 23 | | |
| Korea | 31 | Automobiles | 22 | | |
| | | Raw Materials | 21 | | |
| | | Business Services | 18 | | |
| | | Food | 18 | | |
| | | Chemicals | 17 | | |
| | | Construction | 16 | | |
| | | Industrials | 16 | | |

There is an important economic interpretation which can be put on the purely local factor return. Within a market these factor returns represent common risk factors which cannot be eliminated through diversification. For investors who operate globally, however, the purely local factor risk can be reduced by diversification across markets. The implications are two. First, markets where $L_i(t)$ are high are the markets in which the benefits of international diversification may be large. Second, the trend in $L_i(t)$ through time shows how these benefits have varied through time. In Table 13 we present the results of the regression $$L_i(t) = \alpha + \beta t + \epsilon_i(t)$$

Some marked trends are evident. In particular, most markets appear to be trending towards lower values of $L_i(t)$. This finding could be interpreted as evidence of increasing global integration. However, we caution that the properties of $L_i(t)$ have not yet been investigated sufficiently in depth for us to lay much stress on this finding.

TABLE 13

Trend in $L_i$ (t) (estimated over January 1990–January 2000)

| | | | t-statistics on | | |
|---|---|---|---|---|---|
| market | α | β | α | β | $R^2$ (%) |
| Australia | 1.20 | −0.0007 | 152.1 | −7.0 | 26 |
| Brazil | 1.25 | −0.0044 | 91.7 | −7.2 | 59 |
| Canada | 0.77 | −0.0004 | 108.8 | −5.1 | 16 |
| France | 0.85 | 0.0007 | 46.2 | 3.2 | 7 |

TABLE 13-continued

Trend in $L_i$ (t) (estimated over January 1990–January 2000)

| | | | t-statistics on | | |
|---|---|---|---|---|---|
| market | α | β | α | β | $R^2$ (%) |
| Greece | 0.98 | −0.0070 | 156.7 | −7.6 | 86 |
| Germany | 0.92 | 0.0014 | 44.4 | 6.8 | 21 |
| Hong Kong | 0.95 | −0.0037 | 177.7 | −15.0 | 86 |
| Indonesia | 1.11 | −0.0067 | 87.8 | −11.2 | 79 |
| Japan | 0.48 | 0.0031 | 31.9 | 24.3 | 75 |
| Korea | 1.23 | 0.0018 | 30.1 | 3.7 | 9 |
| Malaysia | 1.19 | −0.0028 | 319.2 | −21.5 | 91 |
| Mexico | 1.02 | 0.0010 | 24.4 | 1.3 | 2 |
| Netherlands | 1.28 | −0.0048 | 72.4 | −11.4 | 65 |
| New Zealand | 1.26 | 0.0008 | 132.9 | 5.9 | 23 |
| South Africa | 1.01 | −0.0027 | 196.9 | −14.9 | 83 |
| Singapore | 1.07 | −0.0062 | 211.5 | −26.1 | 95 |
| Sweden | 0.98 | −0.0008 | 109.0 | −6.4 | 24 |
| Switzerland | 1.02 | −0.0006 | 284.7 | −11.9 | 53 |
| Thailand | 1.30 | −0.0029 | 51.4 | −4.6 | 24 |
| Taiwan | 1.28 | 0.0021 | 203.7 | 13.6 | 73 |
| United Kingdom | 0.99 | −0.0005 | 213.6 | −11.7 | 41 |
| United States | 0.62 | 0.0006 | 269.5 | 28.7 | 81 |

We have not made any systematic investigation of the contribution of purely local common factors to performance. However, we have permitted ourselves a simple case study. We considered the MSCI U.S. index portfolio and decomposed its return over the October 1989–November 1999 period into various components. The results are given in Table 14. Unsurprisingly, the U.S. factor in the Global Equity Model contributed most of the returns. However, the return from purely local U.S. common factors was slightly greater than the contribution from the global industries and risk indices. The net contribution of the purely local factors was 1.9% per annum. Thus, purely local effects can make a meaningful contribution to performance. We note that the number of purely local effects is ten to twenty times the number of global effects. Thus, for equal skill in picking global and local factors, the fundamental law of active management favors strategies based on purely local factors over those based on global factors.

TABLE 14

Return Decomposition for the MSCI US Portfolio (October 1989 to November 1999, arithmetic excess returns)

| Factor | Cumulative Return (%) | Mean Return (% pa) |
|---|---|---|
| World | 10.5 | 1.0 |
| US | 95.5 | 6.9 |
| other global common factors | 19.7 | 1.8 |
| purely local common factors | 20.9 | 1.9 |
| specific | 7.2 | 0.7 |
| total | 235 | 12.9 |

Portfolio Analysis
Market Portfolios

Next, we turn to a consideration of portfolios. The simplest portfolio to consider is the market portfolio $h_m^i$ of country i. The analysis of this portfolio in the Global Equity Model Version 2.0 is identical with its analysis in the single country model for that country. By contrast, the analysis in the Global Equity Model is different. Table 15 compares the Global Equity Model Version 2.0 estimate of risk with the Global Equity Model estimate.

TABLE 15

Comparison of Country Variance Estimates
(variances × 10,000 as of April 1999)

| Country | Global Equity Model Version 2.0 | Global Equity Model |
|---|---|---|
| Australia | 223.3 | 555.9 |
| Brazil | 1936.7 | 2473.7 |
| Canada | 277.0 | 418.3 |
| France | 395.2 | 326.7 |
| Greece | 1939.7 | 1597.2 |
| Hong Kong | 1517.7 | 1136.4 |
| Indonesia | 2691.8 | 3040.0 |
| Japan | 578.5 | 810.7 |
| Malaysia | 1556.2 | 810.7 |
| Mexico | 655.8 | 1429.4 |
| Netherlands | 335.3 | 274.3 |
| New Zealand | 515.0 | 625.8 |
| South Africa | 674.5 | 1183.5 |
| Singapore | 1314.4 | 881.7 |
| Switzerland | 417.9 | 422.1 |
| Thailand | 1619.0 | 1526.9 |
| Taiwan | 2376.3 | 2218.2 |
| United Kingdom | 300.6 | 280.7 |
| United States | 221.8 | 293.7 |

The next level of analysis considers the covariance between $h_m^i$ and $h_m^j$ for two countries i and j. In the Global Equity Model Version 2.0, this measure probes the off diagonal block $C^{ij}$. Table 16 presents the Global Equity Model Version 2.0 and the Global Equity Model analyses. It will be seen that the Global Equity Model Version 2.0 typically estimates a lower correlation, which implies a greater benefit from international diversification. Here, an important difference in the two analyses appears to be the Global Equity Model Version 2.0 recognition that much cross-market correlation derives from the world factor which displays pronounced conditional heteroscedasticity. By contrast, the Global Equity Model assumes a homoscedastic world. If we drop from the empirical data the months when the world return was greatest (October 1987, August 1998) and calculate the correlation of the empirical data series, we see that the Japan correlation in particular shift to being closer to the Global Equity Model Version 2.0 estimates than to the Global Equity Model estimates. However, other empirical correlation remain significantly higher than the Global Equity Model Version 2.0 estimates.

TABLE 16

Selected Country Correlations (as of April 1999, in percent)

| country pair | Global Equity Model Version 2.0 | Global Equity Model | Historic-filtered |
|---|---|---|---|
| Australia-Brazil | 11 | 30 | 32 |
| Canada-United States | 28 | 69 | 66 |
| France-United Kingdom | 29 | 52 | 63 |
| Hong Kong-Japan | 3 | 35 | 16 |
| Japan-United States | 25 | 36 | 22 |
| Switzerland-Sweden | 9 | 48 | 49 |
| United Kingdom-United States | 39 | 59 | 56 |

A Case Study

To gain further insight we consider a simple case study. We take our investable universe to consist of just four stocks: Toyota, Mitsubishi Trust Bank, General Motors, and BankAmerica. We take the benchmark portfolio to be the equally weighted portfolio holding these four assets. We take the managed portfolio to consist equally of Mitsubishi Trust Bank and General Motors. Thus, the active portfolio, i.e. the difference between the managed portfolio and the benchmark, is:

| | |
|---|---|
| Toyota | −25% |
| Mitsubishi Trust Bank | 25% |
| General Motors | 25% |
| BankAmerica | −25% |

TABLE 17

Global Equity Model Risk Exposures

| | |
|---|---|
| Japan Market | 0.20 |
| US Market | −0.09 |
| Size | 0.48 |
| Success | 0.17 |
| Value | 0.07 |
| Volatility in Markets | 0.63 |

It will be noted that the active portfolio has no net exposure to Yen/Dollar, Japan/U.S. or Autos/Banks. We analyze the risks of the active portfolio in both the Global Equity Model and the Global Equity Model Version 2.0. In the Global Equity Model the risk exposures are as shown in Table 17.

It will be noted that the Global Equity Model perceives a country risk, despite there being no active distribution in portfolio wealth between countries, because the Global Equity Model calculates the country exposures based on historical beta and the betas of these assets are not all 1.0. In Table 18 we present the Global Equity Model risk decomposition.

TABLE 18

Global Equity Model Risk Decomposition
(variance per month × 10,000)

| Type | Risk |
|---|---|
| Common Factor: | |
| risk indices | 2.6 |
| industries | 0.0 |
| countries | 22.9 |
| currencies | 0.0 |
| 2x covariance | 1.3 |
| Total | 26.8 |
| Specific | 156.6 |
| Total | 183.4 |

Most of the risk is specific. Such common factor risk as there is derives largely from the country exposures. Next, we turn to the Global Equity Model Version 2.0 analysis. As with the Global Equity Model, the Global Equity Model Version 2.0 sees no currency exposure in the active portfolio. In other details, however, the Global Equity Model Version 2.0 paints a significantly different picture. The risk exposures revealed by the Global Equity Model Version 2.0 are given in Table 19.

TABLE 19

Global Equity Model Version 2.0 Risk Exposures

| Japan Local Factors | | US Local Factors | |
|---|---|---|---|
| Systematic Variability | 0.39 | Volatility | −0.03 |
| Size | −0.33 | Momentum | 0.07 |
| Value | −0.13 | Size | −0.13 |
| Trading Activity | 0.21 | Size non-linearity | −0.013 |
| Success | −0.11 | Trading Activity | 0.07 |
| Interest Rate Sensitivity | −0.03 | Growth | −0.16 |
| Specific Variability | 0.18 | Earning Yield | 0.14 |
| Financial Leverage | 0.09 | Value | 0.24 |
| Growth | −0.26 | Earnings Variability | −0.04 |
| Foreign Sensitivity | −1.08 | Leverage | 0.15 |
| TSE2 | 0 | Currency Sensitivity | 0.08 |
| Autos | −0.25 | Yield | −0.10 |
| Industrial Banks | 0.25 | Non-estimation Universe | 0.0 |
| | | Autos | 0.15 |
| | | Banks | −0.25 |
| | | Financial Services | 0.10 |

Two exposures in particular are revealed which the Global Equity Model analysis missed. First, the Mitsubishi Trust Bank is more domestically focused than Toyota, so the active portfolio contains a significant tilt towards the Japanese domestic economy as revealed by the negative exposure to the foreign sensitivity risk index. Second, General Motors has significant exposure to the financial service industry through its credit corporation subsidiary, a fact which is captured by the multi-industry exposures supported by the USE3 model underlying the Global Equity Model Version 2.0. The Global Equity Model Version 2.0 risk decomposition is shown in Table 20.

TABLE 20

Global Equity Model Version 2.0 Risk Decomposition

| Risk | Japan | US | All |
|---|---|---|---|
| Common Factor | | | |
| Industries | 33.7 | 5.8 | 39.5 |
| Risk | 33.7 | 0.8 | 34.5 |
| 2x within market covariance | 18.6 | 0.0 | 18.6 |
| 2x cross market covariance | — | — | −4.1 |
| Total Common Factor | 85.0 | 6.6 | 88.6 |
| Specific | 146.7 | 49.9 | 196.5 |
| Total | 23.17 | 56.5 | 285.2 |

Superficially, the Global Equity Model Version 2.0 analyses seems similar to the Global Equity Model analysis in that the estimated total active risk is roughly comparable in the two analyses (183.4 vs 285.2). Probing more deeply, however, we find striking differences in the risk decomposition. The common factor risk estimated by the Global Equity Model Version 2.0 is 88.6, more than three times the Global Equity Model estimate of 26.8. Most of this common factor risk derives from the Japan subportfolio, and may be attributed nearly equally to industry tilts and to risk index tilts. The unimportant contribution to the total of cross-market covariance between the U.S. and Japan subportfolios (−4.1) indicates that relatively little hedging occurs between those portfolios. The Global Equity Model assumed that the industry tilts within the U.S. and Japan subportfolios canceled one another. The Global Equity Model Version 2.0 is skeptical of this cancellation.

A Second Case Study

Let us consider the implication of this study. As we know, the specific risk of a portfolio (measured in variance term) scales as 1/N for N the number of assets in the portfolio. The common factor risk, however, generally does not scale down so quickly with increasing N. As we have seen, the Global Equity Model and the Global Equity Model Version 2.0 differ in their perception of how much common factor risk a portfolio contains. By allowing N to increase, we should be able to dramatize the difference in the two analyses. To demonstrate this effect, we take our investable universe to consist of Banks and Chemicals. We switch from Autos to Chemicals as the Chemical industry is less consolidated than the Auto industry and thus we are able to increase N to a greater degree.

We construct a case for N=4 and a case for N=74. In the case N=4 the benchmark is:

| 25% | Fuji Bank |
|---|---|
| 25% | Shin-Etsu Chemicals |
| 25% | BankAmerica |
| 25% | du Pont |

In the case N=74 the benchmark is allocated

| 25% | Japan Banks |
|---|---|
| 25% | Japan Chemicals |
| 25% | U.S. Banks |
| 25% | U.S. Chemicals | and the benchmark is capitalization weighted within each subdivision. In both cases the managed portfolio holds the Japan Chemicals and the U.S. Banks contained in the benchmark. The resulting exposures are as given in Table 21 and 22. It will be noted that in both the Global Equity Model and the Global Equity Model Version 2.0 analyses the mean absolute exposures move somewhat towards zero as N increases. For risk indices this effect occurs as the indices are normalized to zero across the estimation universe, so as N increases they tend to move closer to the universe mean, namely 0. For countries in the Global Equity Model the mean asset beta is one, and as the number of assets in the portfolio grows the mean country exposure moves towards one, thus reducing the active country exposure. For industries, as N increases one picks up exposure to more industries through the secondary operations of the firms. Consequently, the mean industry exposure decreases. The total absolute active industry exposure will tend to increase, however. The summary risk decomposition is given in Table 22. In both cases the specific risk decreases by 88%, exactly as expected from the increase in N. In the Global Equity Model risk index and country risk both decrease by 60–70% resulting in a similar decrease in common factor risk. In the Global Equity Model Version 2.0 risk index risk decreases more, by 80%. However, industry risk actually increases by 33%, and so common factor risk decreases by only 54%. In the N=4 case the Global Equity Model Version 2.0 common factor risk started out as 5.8 times larger than the Global Equity Model common factor risk. Because the Global Equity Model Version 2.0 common factor risk decreases less with increasing N, the Global Equity Model Version 2.0 common factor risk ends up 8.9 times larger than the Global Equity Model common factor risk. For specific risk, the Global Equity Model Version 2.0 estimate starts out 1.5 times larger than the Global Equity Model estimate. Since the specific risk declines nearly equally with increasing N in both analyses, the Global Equity Model Version 2.0 specific risk estimate ends up as 1.7 times the Global Equity Model estimate. Finally, the total risk estimate moves from being twice as large with the Global Equity Model Version 2.0 to being 3.4 times larger than the Global Equity Model estimate. Thus, the Global Equity Model Version 2.0 sees 90 units of risk versus the Global Equity Model's estimate of 27 units. In units of standard definition per annum, the Global Equity Model Version 2.0 sees a 33% risk versus the Global Equity Model's estimate of an 18% risk. The differences in the analyses are indeed dramatic.

TABLE 21

Global Equity Model Version 2.0 Risk Exposures (as of April 1998)

|  | Small Portfolio | Large Portfolio |
|---|---|---|
| Japan Local Factors |  |  |
| Growth | 0.82 | 0.30 |
| specific variability | −0.74 | −0.28 |
| foreign sensitivity | 0.69 | 0.58 |
| systematic variability | −0.66 | −0.18 |
| success | 0.44 | 0.20 |
| interest rate sensitivity | −0.32 | −0.18 |
| value | 0.30 | 0.34 |
| size | −0.18 | −0.38 |
| financial leverage | −0.12 | 0.11 |
| trading activity | −0.06 | 0.05 |
| city bank | −0.25 | −0.12 |
| regional bank | 0.00 | −0.20 |
| industrial bank | 0.00 | −0.08 |
| chemicals | 0.12 | 0.28 |
| textiles | 0.00 | 0.06 |
| 7 other industries | 0.00 | 0.06 |
| Mean Absolute: |  |  |
| risk index exposure | 0.43 | 0.26 |
| industry exposure | 0.06 | 0.13 |
| US Local Factors |  |  |
| earnings yield | 0.16 | 0.07 |
| financial leverage | 0.15 | 0.15 |
| currency sensitivity | −0.12 | −0.06 |
| earnings variablity | 0.12 | 0.18 |
| size | 0.11 | 0.33 |
| growth | 0.11 | 0.20 |
| trading activity | 0.04 | −0.005 |
| value | −0.03 | −0.07 |
| volatility | 0.03 | −0.06 |
| momentum | 0.03 | 0.11 |
| yield | 0.02 | −0.01 |
| size non-linearity | 0.01 | 0.07 |
| bank |  | 0.36 |
| thrift | 0.00 | 0.04 |
| chemicals | −0.20 | −0.33 |
| home products | 0.00 | −0.02 |
| food | 0.00 | −0.01 |
| mining | 0.00 | −0.01 |
| oil refining | −0.06 | −0.007 |
| 4 other industries | 0.00 | −0.02 |
| Mean Absolute: |  |  |
| risk index exposure | 0.08 | 0.11 |
| industry exposure | 0.03 | 0.10 |

TABLE 22

Risk Decomposition (variance per month × 10,000, as of April 1998)

| Model | Global Equity Model Version 2.0 | | | Global Equity Model | | |
|---|---|---|---|---|---|---|
| Case | small | large | % change | small | large | % change |
| common factor risk |  |  |  |  |  |  |
| country | — | — | 0 | 12.4 | 3.8 | −64 |
| industry | 39 | 52 | 33 | 0.0 | 0.0 | 0 |
| risk index | 74 | 15 | −80 | 6.2 | 2.4 | −61 |
| covariances | 9 | −11 | −222 | 2.4 | 0.1 | −96 |
| total | 122 | 56 | −54 | 21 | 6.3 | −70 |
| specific risk | 290 | 34 | −88 | 188 | 20.2 | −89 |
| total risk | 412 | 90 | −78 | 207 | 26.5 | −87 |

| Global Equity Model Version 2.0 risk/ Global Equity Model risk | small | large | % change |
|---|---|---|---|
| common factor risk | 5.8 | 8.9 | 53 |
| specific risk | 1.5 | 1.7 | 9 |
| total risk | 2.0 | 3.4 | 71 |

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

What is claimed is:

1. A computer implemented aggregate risk model for a plurality of asset classes, where construction of the aggregate risk model comprises the steps of:
   integrating a plurality of factor models corresponding to the plurality of asset classes, where integration of the plurality of factor models is based at least in part on:
   one or more global factors (g) that capture covariance among factors (f) associated with the plurality of factor models; and
   exposures (Y) of the factors (f) associated with the plurality of factor models to the one or more global factors (g).

2. The aggregate risk model of claim 1, wherein the one or more global factors (g) are data representative of a a time series of global factor returns, and the factors (f) are data representative of a time series of factor returns for the plurality of factor models for the plurality of asset classes.

3. The aggregate risk model of claim 2, where integration is further based at least in part on:
   data representative of a covariance matrix (G) of the one or more global factors (g); and
   data representative of a covariance matrix ($\Phi$) of residuals (ø).

4. The aggregate risk model of claim 3, wherein residuals (ø) are data representative of a time series of the purely local part of the factor returns of (f).

5. The aggregate risk model of claim 4, wherein the values of f, Y, g and ø conform to f=Yg+ø, and wherein substantially all sources of common covariance between the factors in distinct asset classes are captured.

6. The aggregate risk model of claim 5, where integration is further based at least in part on:
   data representative of a factor covariance matrix (F).

7. The aggregate risk model of claim 6, wherein the data representative of the factor covariance matrix (F), comprises data representative of one or more blocks comprising the factor covariance matrix (F).

8. The aggregate risk model of claim 7, wherein the values of F, Y, G and $\Phi$ conform to $F=YGY^t+\Phi$.

9. The aggregate risk model of claim 8, wherein F is an initial estimate that is then rescaled to bring its diagonal blocks into agreement with the corresponding blocks of factor covariance matrices of the plurality of factor models, whereby a final estimate of F is achieved.

10. The aggregate risk model of claim 9, wherein the initial estimate of F is linearly rescaled with a matrix R, whereby the final estimate $RFR^t$ is achieved.

11. The aggregate risk model of claim 10, wherein an asset—by—asset covariance matrix is formed based on data representative of the final estimate of F, exposures (X) of the factors (f) associated with each of the plurality of factor models, and specific covariance data (D) associated with each of the plurality of factor models, in conformance with $XFX^t+D$, wherein F is the final estimate of F.

12. A computer implemented method for constructing an aggregate risk model for a plurality of asset classes, comprising the steps of:
   integrating a plurality of factor models is based at least in part on data derived from the steps comprising:
      determining one or more global factors (g) that capture covariance among factors (f) associated with the plurality of factor models; and
      determining exposures (Y) of the factors (f) associated with the plurality of factor models to the one or more global factors (g).

13. The method of claim 12, wherein the one or more global factors (g) are data representative of a time series of global factor returns, and the factors (f) are data representative of a time series of factor returns for the plurality of factor models for the plurality of asset classes.

14. The method of claim 13, where integration is further based at least in part on data derived from the steps comprising:
   determining data representative of a covariance matrix (G) of the one or more global factors (g); and
   determining data representative of a covariance matrix ($\Phi$) of residuals ($\emptyset$).

15. The method of claim 14, wherein residuals ($\emptyset$) are data representative of a time series of the purely local part of the factor returns of (f).

16. The method of claim 15, wherein the values of f, Y, g and $\emptyset$ conform to $f=Yg+\emptyset$, and wherein substantially all sources of common covariance among the factors (f) are captured.

17. The method of claim 16, where integration is further based at least in part on data derived from the steps comprising:
   determining data representative of a factor covariance matrix (F).

18. The method of claim 17, wherein the data representative of the factor covariance matrix (F), comprises data representative of one or more blocks comprising the factor covariance matrix (F).

19. The method of claim 18, wherein the values of F, Y, G and $\Phi$ conform to $F=YGY^t+\Phi$.

20. The method of claim 19, wherein integrating further comprises the step of rescaling an initial estimate of F to bring its diagonal blocks into agreement with the corresponding blocks of factor covariance matrices of the plurality of factor models, whereby a final estimate of F is achieved.

21. The method of claim 20, wherein the step of rescaling further comprises linearly rescaling with a matrix R, whereby the final estimate $RFR^t$ is achieved.

22. The method of claim 21, wherein integrating further comprises the step of forming an asset—by—asset covariance matrix based on data representative of the final estimate of F, exposures (X) of the factors (f) associated with each of the plurality of factor models, and specific covariance data (D) associated with each of the plurality of factor models, in conformance with $XFX^t+D$.

23. A computer implemented aggregate risk model for a plurality of asset classes, where construction of the aggregate risk model comprises the steps of:
   integrating a plurality of factor models corresponding to the plurality of asset classes, where integrating of the plurality of factor models is based at least in part on:
   data associated with the plurality of factor models corresponding to the plurality of asset classes; and
   an estimated factor model with one or more global factors (g) that captures the covariance among factors (f) associated with the plurality of factor models.

24. The aggregate risk model of claim 23, wherein integration is further based at least in part on:
   data representative of a covariance matrix (G) of the global factors;
   data representative of a covariance matrix ($\Phi$) of residuals; and
   data representative of exposures (Y) of the factors (f) associated with the plurality of factor models to the one or more global factors (g).

25. The aggregate risk model of claim 24, wherein integration is further based at least in part on:
   data representative of a factor covariance matrix (F).

26. The aggregate risk model of claim 25, wherein F is an intial estimate that is linearly rescaled with a matrix R, whereby a final estimate $RFR^t$ is achieved, and wherein the diagonal blocks of the initial estimate are brought into agreement with the corresponding blocks of factor covariance matrices of the plurality of factor models.

27. A computer implemented method for constructing an aggregate risk model for a plurality of asset classes, comprising the steps of:
   integrating a plurality of factor models corresponding to the plurality of asset classes, where integration of the plurality of factor models is based at least in part on data derived from the steps comprising:
   determining data associated with the plurality of factor models corresponding to the plurality of asset classes; and
   determining an estimated factor model with one or more global factors (g) that captures the covariance among factors (f) associated with the plurality of factor models.

28. The method of claim 27, wherein integration is further based at least in part on data derived from the steps comprising:
   determining data representative of a covariance matrix (G) of the global factors;
   determining data representative of a covariance matrix ($\Phi$) of residuals; and
   determining data representative of exposures (Y) of the factors (f) associated with the plurality of factor models to the one or more global factors (g).

29. The method of claim 28, wherein integration is further based at least in part on data derived from the step comprising:
   determining data representative of a factor covariance matrix (F).

30. The method of claim 29, wherein F is an initial estimate, and further comprising the step of linearly rescaling the initial estimate with a matrix R, whereby a final estimate $RFR^t$ is achieved, and wherein the diagonal blocks of the initial estimate are brought into agreement with the corresponding blocks of factor covariance matrices of the plurality of factor models.

31. A computer implemented method for combining two or more risk models to provide an aggregate risk model for a plurality of asset classes, for risk analysis, comprising the steps of:

determining a factor risk model, having one or more factors, for each of the asset classes;

combining the factor risk models to form and output an aggregate risk factor model based at least in part on:

data associated with each of the factor risk models comprising: one or more time matrix to form and output an aggregate risk model with wider scope than the factor risk models; and wherein the aggregate risk model is consistent with each of the factor risk models.

32. The method of claim 31, wherein the step of combining the factor risk models to form and output an aggregate risk factor model is further based at least in part on data associated with one or more global factors.

* * * * *

UNITED STATES PATENT AND TRADEMARK OFFICE
CERTIFICATE OF CORRECTION

PATENT NO. : 7,024,388 B2
APPLICATION NO. : 09/895605
DATED : April 4, 2006
INVENTOR(S) : Stefek et al.

It is certified that error appears in the above-identified patent and that said Letters Patent is hereby corrected as shown below:

Column 34,
Line 37, "(g) are data representative of a a time" should read -- (g) are data representative of a time --.

Column 35,
Line 14, "integrating a plurality of factor models is based" should read -- integrating a plurality of factor models corresponding to the plurality of asset classes, where integration of the plurality of factor models is based --.

Column 36,
Line 5, "integrating" should read -- integration --.
Line 26, "intial" should read -- initial --.

Column 37,
Line 10, "comprising: one or more time matrix" should read -- comprising: one or more time series of returns to the factors, a factor covariance matrix, and a specific covariance matrix --.

Signed and Sealed this

Eleventh Day of July, 2006

JON W. DUDAS
*Director of the United States Patent and Trademark Office*